United States Patent [19]
Gissler et al.

[11] Patent Number: 5,680,049
[45] Date of Patent: Oct. 21, 1997

[54] APPARATUS FOR MEASURING FORMATION RESISTIVITY THROUGH A CONDUCTIVE CASING HAVING A COAXIAL TUBING INSERTED THEREIN

[75] Inventors: Robert W. Gissler, Spring; Otto Fanini, Stafford, both of Tex.; Jacques Maissa, Roswell, N. Mex.; H. Wade Bullock, Houston; Peter Rellinger, Cypress, both of Tex.

[73] Assignee: Western Atlas International, Inc., Houston, Tex.

[21] Appl. No.: 570,113

[22] Filed: Dec. 11, 1995

[51] Int. Cl.⁶ .................................. G01V 3/24
[52] U.S. Cl. ........................... 324/368; 324/371
[58] Field of Search ......................... 324/366, 367, 324/368, 373, 374, 375, 355

[56] References Cited

U.S. PATENT DOCUMENTS

| | | | |
|---|---|---|---|
| 3,356,146 | 12/1967 | Anderson | 324/367 |
| 5,075,626 | 12/1991 | Vail, III | 324/368 |
| 5,543,715 | 8/1996 | Singer et al. | 324/368 |

*Primary Examiner*—Walter E. Snow
*Attorney, Agent, or Firm*—Richard A. Fagin

[57] ABSTRACT

An apparatus for measuring the resistivity of earth formations penetrated by a wellbore having a conductive conduit. The apparatus includes an elongated sonde mandrel, a plurality of electrodes positioned at axially spaced apart locations along the mandrel, the electrodes being electrically insulated from the mandrel and from each other, the electrodes adapted to electrically contact the conduit and positioned collinearly so that the electrodes contact the conduit when the mandrel is radially displaced towards the wall of the conduit. Some electrodes are for injecting electrical current into the conduit, other electrodes are for measuring voltage drop along the conduit at axially spaced apart locations. The mandrel includes selectively extensible locking arms for urging the mandrel into contact with the conduit. The arms are radially positioned opposite to the electrodes. The apparatus includes a source of electrical current connected to the current injector electrodes, a circuit for measuring output of the source of electrical current, voltage measuring circuits connected to the voltage drop electrodes, and means for recording measurements of current and voltage drop.

17 Claims, 13 Drawing Sheets

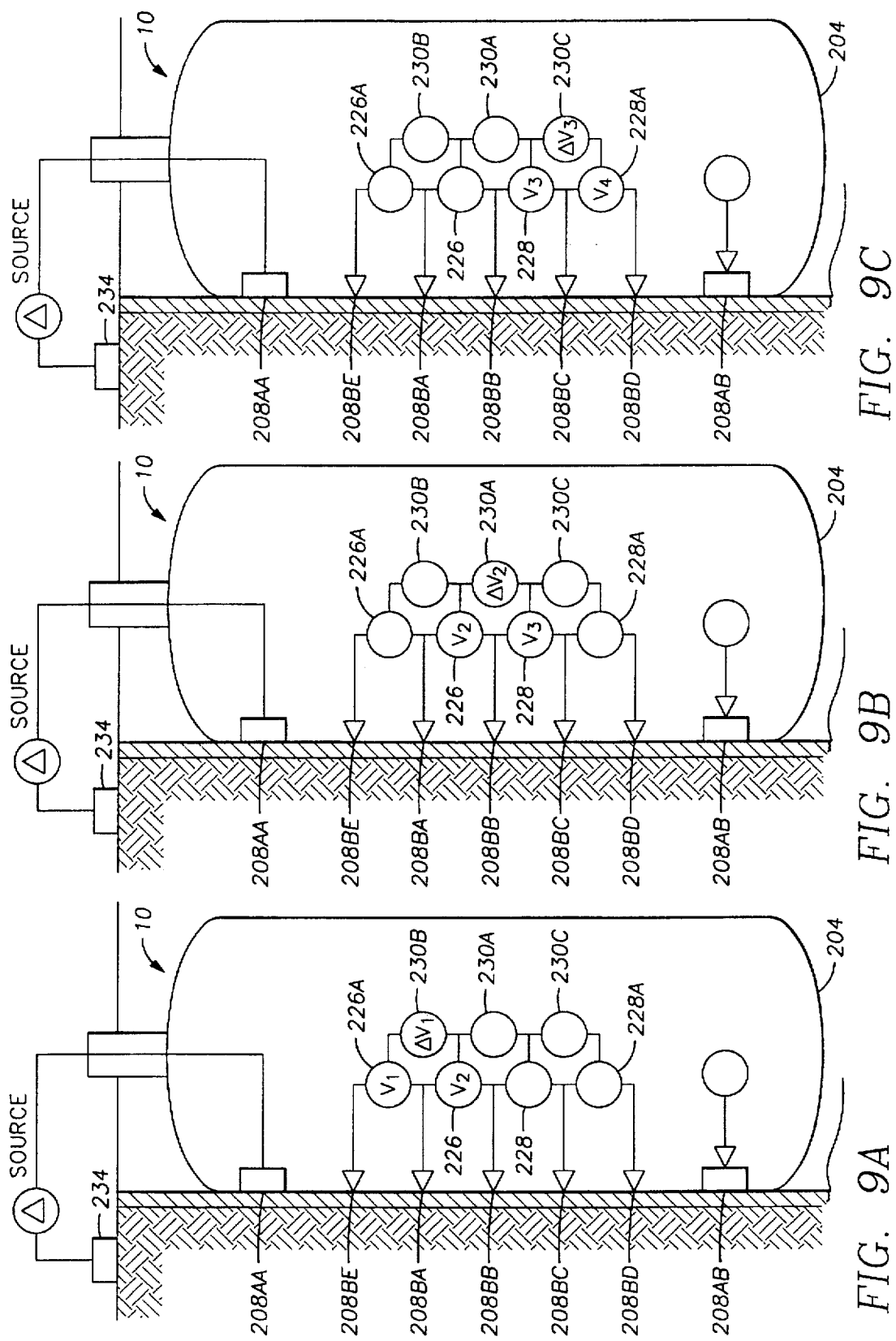

APPARATUS FOR MEASURING FORMATION RESISTIVITY THROUGH A CONDUCTIVE CASING HAVING A COAXIAL TUBING INSERTED THEREIN

BACKGROUND OF THE INVENTION

1. Field of the Invention

The present invention is related to the field of well logging instruments. More specifically, the present invention is related to well logging instruments which measure electrical resistivity of earth formations from within a wellbore having a conductive casing inserted therein.

2. Description of the Related Art

Well logging instruments are used to measure various properties of earth formations penetrated by wellbores. One of the more important properties of the earth formations measured by well logging instruments is electrical resistivity. Electrical resistivity measurements are used for, among other purposes, determining fluid content of the earth formations.

Electrical resistivity well logging instruments are more typically lowered into wellbores which have not yet been "completed". Completion of a wellbore generally includes inserting a steel pipe, or casing, into the wellbore to maintain the mechanical integrity of the earth formations penetrated by drilling the wellbore and to hydraulically isolate the earth formations from each other. Steel pipe is highly electrically conductive and precludes measurement of electrical resistivity of earth formations using typical well logging instruments.

An apparatus for measuring resistivity from within a wellbore having a conductive casing is known in the art. Such an apparatus is described, for example, in U.S. Pat. No. 5,075,626 issued to Vail. The apparatus in the Vail '626 patent includes a sonde having a plurality of electrodes at axially spaced apart locations along the sonde. The electrodes are adapted to electrically contact the casing. Some of the electrodes are used to inject electrical current into the casing and other ones of the electrodes are used to measure voltage drop at axially spaced apart locations along the casing. Some of the electrical current which is injected into the casing "leaks" out into the earth formations in electrical contact with the exterior of the casing. The amount of current leakage is related to casing resistance and formation resistivity. Some of the measurement of voltage drop across the electrodes can therefore be related to resistivity of the earth formation.

A drawback to the apparatus disclosed in the Vail '626 patent is that each one of the electrodes typically comprises a plurality of electrical "contactors" which are radially equally spaced around the circumference of the instrument. Each contactor is attached to an extensible linkage mechanism for placing the contactor into contact with the casing. One reason for equally radially spacing the contactors around the instrument is that it was believed that substantially symmetrical distribution of voltage drop measurements around the circumference of the casing was desirable to accurately determine voltage drop resulting from the casing resistance. Having equally radially spaced contactors, and linkages to support the contactors in such positions, generally requires an arrangement of linkages which places the sonde substantially in the center of the wellbore. A substantial number of wellbores are drilled so as to have sections which are highly inclined from vertical. The apparatus in the Vail '626 patent is subject to displacement from the center of the wellbore by gravity in highly inclined sections, which could cause some of the contactors to be removed from contact with the casing, thereby distorting the voltage drop measurements.

Completed wellbores typically include a smaller diameter pipe, called tubing, coaxially inserted inside the casing, primarily to increase the velocity of fluids being produced from the earth formations. Because of the linkages on which the contactors are disposed, the apparatus in the Vail '626 patent typically has an external diameter too large to pass through tubing. It is difficult and expensive for the wellbore operator to remove the tubing, so the apparatus disclosed in the Vail '626 patent can be undesirable for use in wellbores having coaxially inserted tubing.

Another drawback to the apparatus disclosed in the Vail '626 patent is that the contactors are subject to rapid wear or breakage since the contactors are adapted to be placed in substantially continuous contact with the casing, even as the sonde is moved through the casing to measure resistivity at different depths in the wellbore.

Yet another drawback to the apparatus in the Vail '626 patent is that the apparatus does not have any means for determining whether any individual contactor is making good electrical contact with the casing. Measurements of electrical resistivity using the apparatus disclosed in the Vail '626 patent are subject to error caused by poor electrical contact of any of the contactors with the casing. If poor electrical contact between the contactor and the casing is not detected and accounted for, it is possible that any error in the resistivity measurements will also go undetected.

Accordingly, it is an object of the present invention to provide an apparatus for measuring electrical resistivity of earth formations from inside a wellbore having a conductive casing which apparatus can be operated against a wall of the casing and is therefore substantially immune from error caused by gravity-induced decentralization of the instrument.

It is a further object of the present invention to provide an apparatus for measuring electrical resistivity of earth formations from inside a wellbore having a conductive casing which apparatus can be inserted into wellbores having tubing coaxially inserted inside the casing.

It is yet another object of the present invention to provide an apparatus for measuring electrical resistivity of earth formations from within a wellbore having a conductive casing which apparatus has electrodes which are not subject to extreme wear as the instrument is moved through the casing.

It is still a further object of the present invention to provide an apparatus for measuring electrical resistivity of an earth formation from within a wellbore having conductive casing which apparatus includes means for determining the electrical contact resistance of the individual electrodes with the casing to reduce the possibility of undetected measurement error.

SUMMARY OF THE INVENTION

The present invention is an apparatus for measuring the resistivity of earth formations penetrated by a wellbore having a conductive conduit inserted therein. The apparatus includes an elongated sonde mandrel adapted to traverse the interior of the conduit. A plurality of electrodes is positioned at axially spaced apart locations along the sonde mandrel, the electrodes being electrically insulated from the sonde mandrel and from each other. The electrodes are adapted to electrically contact the conduit and are positioned substantially collinearly so that the electrodes contact the conduit when the sonde mandrel is radially displaced towards the wall of the conduit. Some of the electrodes are used for injecting electrical current into the conduit, other ones of the electrodes are used for measuring voltage drop along the conduit at axially spaced apart locations. The sonde mandrel includes selectively extensible locking arms for urging the mandrel into contact with the conduit. The arms are radially positioned opposite to the electrodes. The apparatus includes a source of electrical current connected to the current injector electrodes, a circuit for measuring output of the source of electrical current, voltage measuring circuits connected to the voltage drop electrodes, and means for recording measurements of current and voltage drop.

In a preferred embodiment of the invention, the sonde mandrel includes a "kick-off" assembly positioned at the axial location of the center of each one of the locking arms so that the arms can be initially displaced from the mandrel, or if the arms cannot be sufficiently displaced because the internal diameter of the conduit is too small, the kick-off assemblies can themselves urge the mandrel into contact with the wall of the conduit.

BRIEF DESCRIPTION OF THE DRAWINGS

FIGS. 9A, 9B and 9C show alternative arrangements of electrodes which enable making resistivity measurements at more than one depth in the wellbore while the instrument is stationary.

DESCRIPTION OF THE PREFERRED EMBODIMENT

Figure 1A:
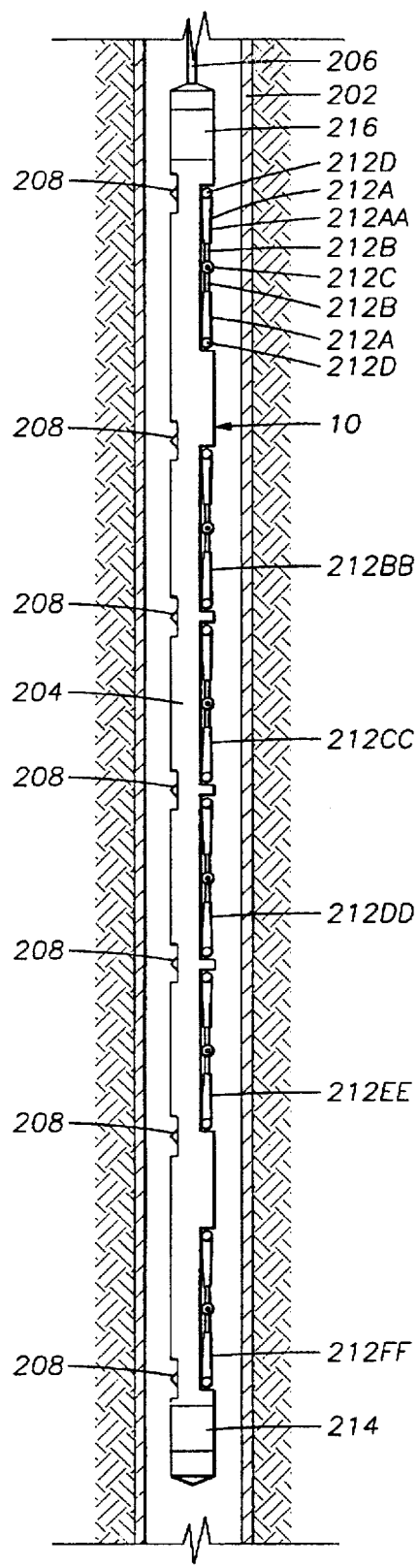
FIG. 1A shows an apparatus according to the present invention for measuring formation resistivity from inside a wellbore casing when the apparatus is configured to travel through a coaxial tubing inside the casing. The apparatus is shown in a retracted position.

FIG. 1A shows an instrument 10 for measuring electrical resistivity of earth formations (not shown separately in FIG. 1A) from inside a conductive casing 202 inserted into a wellbore drilled through the earth formations. As is understood by those skilled in the art, the casing 202 is typically inserted into the wellbore (not shown in FIG. 1A for clarity of the illustration) to isolate hydraulic zones in the earth formations from each other and to maintain the mechanical integrity of the wellbore. The instrument 10 in FIG. 1A is shown in a retracted position. When the instrument 10 is in the retracted position, it is freely able to traverse the interior of the casing 202, and to traverse the interior of a tubing (not shown in FIG. 1A for clarity of the illustration) which can be coaxially inserted inside the casing 202. When in the retracted position, the instrument 10 will typically not itself become damaged, nor will it cause damage to the interior of the casing 202 or tubing when moved through the casing 202 or tubing. The tubing (not shown) can be coaxially inserted inside the casing 202 in some wellbores, for among other reasons, to increase the velocity of fluids produced from the earth formations (not shown), as is understood by those skilled in the art.

The instrument 10 is typically lowered into and withdrawn from the casing 202 by means of an armored electrical cable 206. As is understood by those skilled in the art, the cable 206 can include at least one insulated electrical conductor (not shown separately). The conductor is used for transmitting electrical power to the instrument 10 and for communicating signals from the instrument 10 to equipment (not shown separately in FIG. 1) disposed at the earth's surface. The equipment (not shown) at the earth's surface is used for observation and recording of the signals. Signals corresponding to measurements of electrical resistivity of the earth formations can be generated in a telemetry/control unit 216 disposed in the instrument 10, as will be further explained, for transmission to the earth's surface.

The instrument 10 includes a sonde mandrel 204. A plurality of selectively extensible electrodes, each shown generally at 208, are attached to the mandrel 204 at axially spaced apart locations. Each one of the electrodes 208, as will be further explained, includes means (not shown in FIG. 1A) for causing the electrode 208 to be selectively extended from and retracted into a mating receptacle (not shown in FIG. 1A) in the mandrel 204. When extended, the electrodes 208 can electrically contact the casing 202. When the electrodes 208 are retracted, the instrument 10 may be moved through the casing 202 or the tubing (not shown) without causing damage to the casing 202, the tubing, or to the electrodes 208 themselves.

The electrodes 208 are electrically insulated from the mandrel 204 and from each other. Some of the electrodes 208, as will be further explained, can be used to inject electrical current into the casing 202. Other ones of the electrodes 208 can be connected to voltage measuring circuits (not shown in FIG. 1A), as will be further explained. The electrodes 208 which are connected to the voltage measuring circuits are used to measure the voltage drop along the casing 202 at axially spaced apart locations.

The mandrel 204 includes a plurality of selectively extensible locking arms, shown generally at 212AA through 212FF. The arms 212AA–212FF can be positioned substantially collinearly at axially spaced apart locations along the mandrel 204. The arms 212AA–212FF preferably are disposed on the mandrel radially opposite to the electrodes 208.

When retracted, the arms 212AA–212FF enable the mandrel 204 to travel relatively unimpeded through the tubing (not shown) and through the casing 202. When extended, the arms 212AA–212FF force the mandrel 204 into contact with the casing 202 so that the electrodes 208, when extended, can make contact with the casing 202. The arms can comprise two different configurations. One configuration can include intermediate arms 212BB, 212CC, 212DD and 212EE, and uppermost 212AA and lowermost 212FF arms can be of a second configuration. The two different arm configurations will be further explained. Extension and retraction of the arms 212AA–212FF, as will be further explained, preferably can be performed by hydraulic fluid pressure. Hydraulic fluid pressure can be supplied by an hydraulic power unit, shown generally at 214, which will be further explained.

Figure 1B:
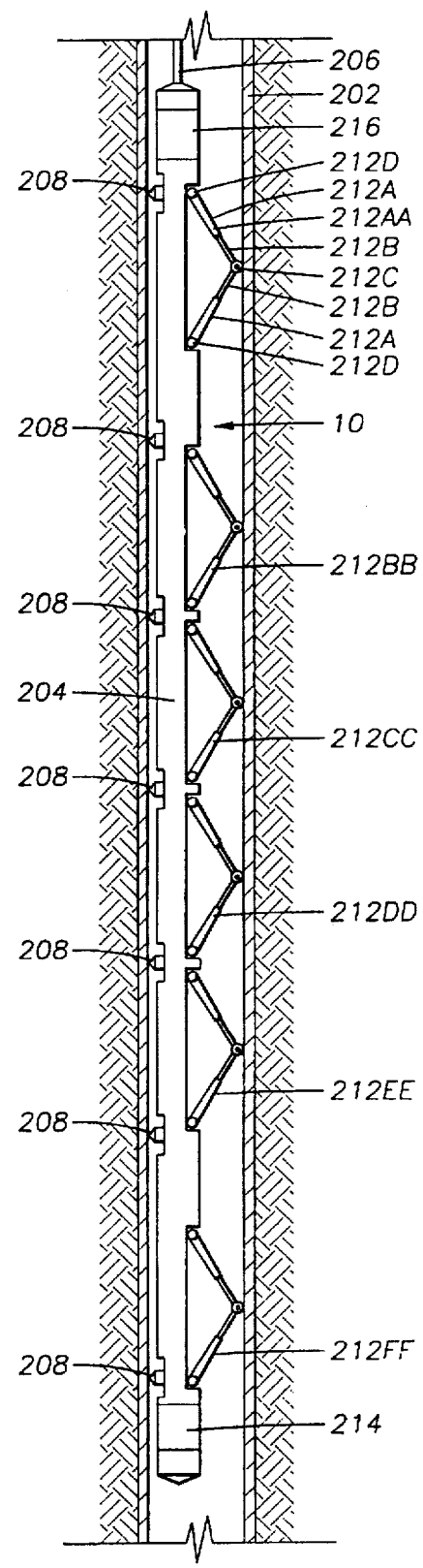
FIG. 1B shows the apparatus of the present invention configured to make measurements of formation resistivity from inside the casing. The apparatus is shown in an extended, or deployed, position.

FIG. 1B shows the instrument 10 when the electrodes 208 and the arms 212AA–212FF are extended to place the electrodes 208 into contact with the casing 202. FIG. 1B shows intermediate arms 212BB, 212CC, 212DD and 212EE in more detail. Each one of the intermediate arms 212BB, 212CC, 212DD and 212EE can include two pairs of opposing hydraulic cylinders, each of which is shown generally at 212A. Uppermost and lowermost arms 212AA and 212FF, as previously explained, can have a slightly different configuration which will be shown in more detail herein. Each of the cylinders 212A can each be mounted to the mandrel 204 on a pivot 212D, through which hydraulic fluid can flow in sealed channels, as will be further explained. The pivot 212D enables the longitudinal axis of each cylinder 212A to rotate away from the longitudinal axis of the mandrel 204. The cylinders 212A can be mounted in opposing pairs, as shown in FIG. 1B, in which the pivots 212D are located at the outer end of each opposing pair. An hydraulic piston, shown generally at 212B and which can be of a type known in the art, is adapted to travel through each one of the cylinders 212A so as to extend the overall length of the combination of cylinder 212A and piston 212B when the piston 212B is caused to extend by hydraulic fluid pressure. Extending ends of the opposing pairs of pistons 212B can be connected to each other by a center pivot 212C. When the system operator selects the arms 212AA–212FF to extend, hydraulic fluid is conducted to the cylinders 212A to cause the pistons 212B to extend from the cylinders 212A, thereby increasing the overall length of each combination of cylinder 212A and piston 212B forming part of each arm 212AA–212FF. Since the piston/cylinder combinations are coupled in opposing pairs, lengthening the cylinder 212A and piston 212B combinations will cause the center pivot 212C of each of those combinations to move radially away from the mandrel 204. By providing pistons 212B and cylinders 212A of appropriate length of travel, the instrument 10 can be positioned inside a casing 202 having an internal diameter much larger than the diameter of the tubing (not shown), whereby use of the instrument 10 within a wide variety of combinations of casing and tubing is possible. In the present embodiment, the effective length of travel of the cylinders 212A and pistons 212B can each be about 3½ inches. It is contemplated that providing cylinders 212A and pistons 212B having greater length of travel can provide the instrument 10 with the capacity to be positioned inside casings having larger internal diameter. Selection of the effective operating length of the pistons 212B and cylinders 212A is a matter of convenience for the system designer and is not to be construed as a limitation on the invention.

As the pistons 212B progressively extend outwardly from the cylinders 212A, and the pistons 212B and cylinders 212A are thereby caused to rotate axially away from alignment with the mandrel 204, a progressively larger component of the force exerted by the pistons 212B will be exerted in a direction axially perpendicular to the mandrel 204. In casings 202 having an internal diameter several inches or more larger than the diameter of the mandrel 204, the arms 212AA–212FF can themselves exert sufficient radially perpendicular force to hold the apparatus 10 against the wall of the casing 202, even against gravity when the instrument is disposed in casings which are substantially horizontal.

When the arms 212AA–212FF are fully retracted, however, the pistons 212B generally cannot by themselves cause the arms 212AA–212FF to extend radially outward from the mandrel 204, because substantially all the force exerted by the pistons 212B is coaxial with the mandrel 204. The force exerted by the pistons 212B when fully retracted has substantially no component directed radially outward from the mandrel 204. Additionally, if the casing 202 has a relatively small internal diameter, or if the apparatus 10 is disposed within a wellbore having only the tubing (not shown), which as is understood by those skilled in the art is sometimes used in substitution for the casing 202, the arms 212AA–212FF may not be able to extend a sufficient radial distance from the mandrel 204 to enable the arms 212AA–212FF to exert sufficient force to hold the mandrel 204 firmly against the wall of the tubing or casing 202. To improve the function of the instrument 10 under these conditions, the present invention can include a plurality of "kick-off" assemblies, an example of which can be observed in more detail by referring to FIG. 2.

Each kick-off assembly 50 can be positioned within the mandrel 204 at substantially the same axial position as each one of the center pivots 212C. The kick-off assembly 50 can be used to provide an initial radial displacement to the collocated pivot 212C away from the mandrel 204. The radial displacement provided by the kick-off assembly 50 can be selected to provide the cylinders 212A and pistons 212B with sufficient angular rotation to enable the axial force exerted by the pistons 212B to continue extending the arms 212AA–212FF radially away from the mandrel 204.

The kick-off assembly 50 can comprise an hydraulic chamber 50A formed into the mandrel 204. A set of coaxial telescoping pistons, shown generally at 62, can be inserted into the chamber 50A. The telescoping pistons 62 are interlocking to limit their extension travel. The telescoping pistons 62 can be internally and externally sealed by o-rings 51 or similar sealing devices. It is to be understood that the use of telescoping pistons is a matter of convenience for the system designer and is not to be construed as a limitation on the invention. It is contemplated that a single piston could also serve the intended function of the kick-off 50.

Extension of the pistons 62 from the chamber 50A is effected when hydraulic fluid is pumped through a first extension hydraulic line 39. The first extension hydraulic line 39 is in hydraulic communication with the underside of the pistons 62. The pistons 62 can be caused to retract when hydraulic fluid is applied to a first retraction hydraulic line 56 which is in hydraulic communication with the upper face of each one of the pistons 62.

In the event that the casing (shown as 2 in FIG. 1A and FIG. 1B) has an internal diameter which is so small as to prevent the arms 212AA–212FF from exerting sufficient force to hold the mandrel 204 securely against the wall of the casing 202, the kick-off assembly 50 can provide additional holding force. Holding force can be supplied by the kick-off assemblies 50 by maintaining hydraulic pressure against the kick-off pistons 62. The means by which hydraulic pressure is applied to the kick off pistons 62 to extend and retract the kick-off pistons 62 will be further explained.

Referring once again to FIG. 1A, as previously explained the arms 212AA-212FF cannot self-extend from the fully retracted position, but the arms 212AA-212FF can, however, fully retract against the mandrel 204 by application of hydraulic pressure to retract the pistons (212B in FIG. 1B) into the cylinders (212A in FIG. 1B). Alternatively, the arms 212AA-212FF can be externally compressed towards the mandrel 204 either by gravity or by mechanical compression, such as when the instrument 10 is withdrawn from the casing 202 into the smaller-diameter tubing (not shown).

Figure 3A:
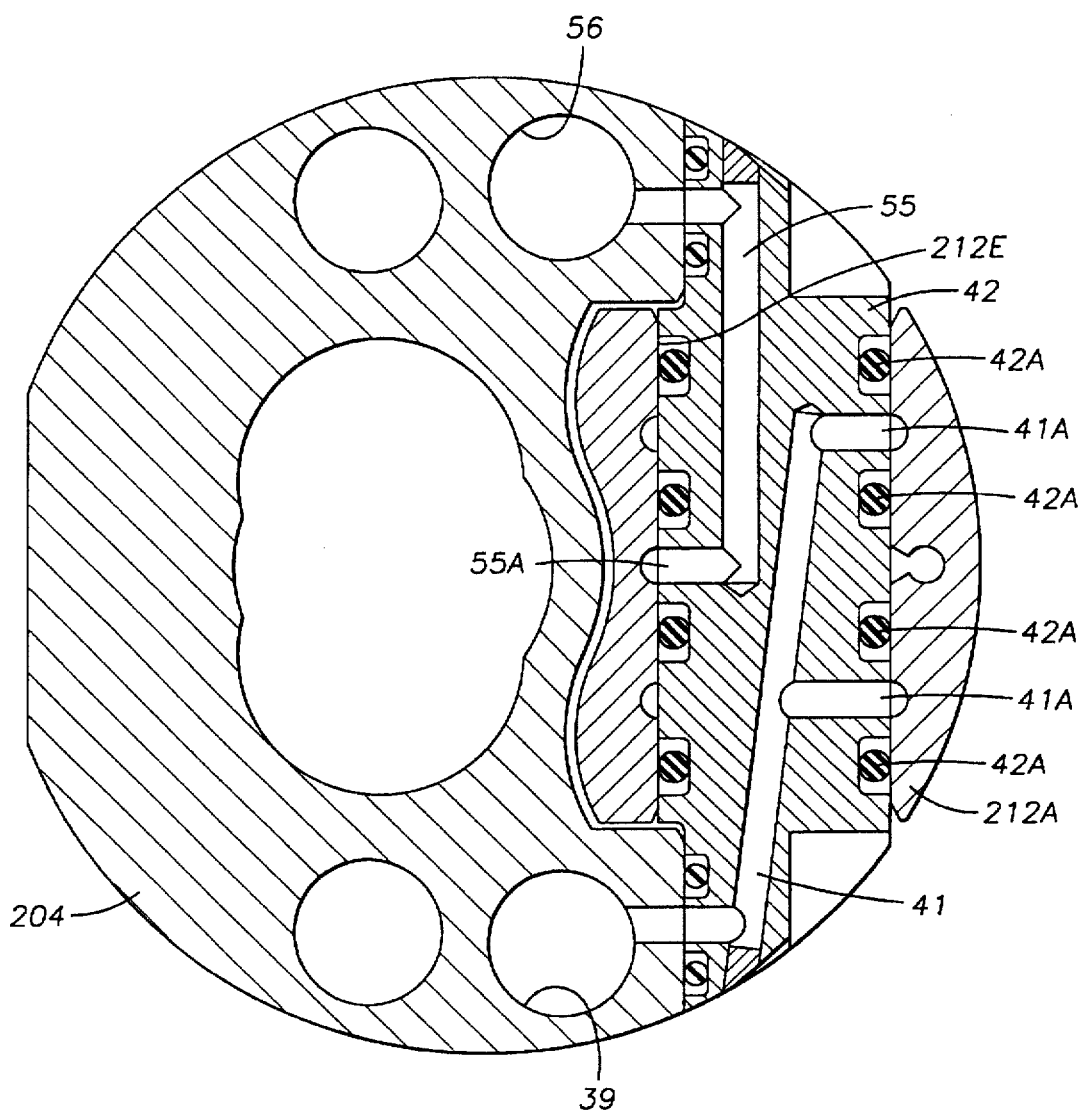
FIG. 3A shows a hydraulically communicating pivot used to attach locking arms to a sonde mandrel of the present invention.

One embodiment of the pivots (shown in FIG. 1B as 212D), which rotatably connects each cylinder to the mandrel 204, is shown in FIG. 3A. The embodiment shown in FIG. 3A enables substantially collinear extension, of the intermediate arms (212BB, 212CC, 212DD and 212EE in FIG. 1B). The lowermost portion of the cylinder is shown having a substantially cylindrical pivot chamber 212E formed therein. A pivot block 42, which can be affixed to the mandrel 204, is disposed inside the pivot chamber 212E. The pivot block 42 has drilled therethrough an extension hydraulic passage 41 and a retraction hydraulic passage 55. The hydraulic passages 41, 55 are hydraulically coupled, respectively, to the first extension hydraulic line 39 and to the first retraction hydraulic line 56. O-rings or similar sealing devices, shown generally at 42A can seal the passages 41, 55 while enabling rotation of the cylinder 212A about the pivot 212D. The hydraulic passages 41, 55 terminate in corresponding fluid passages 41A, 55A which can be formed into the wall of the cylinder 212A. Hydraulic fluid pumped into either the extension passage 41 or the retraction passage 55 is conducted through the corresponding fluid passage 41A, 55A out to the appropriate side of the piston (212B in FIG. 1B) to cause its extension from or retraction into the cylinder 212A.

Figure 3B:
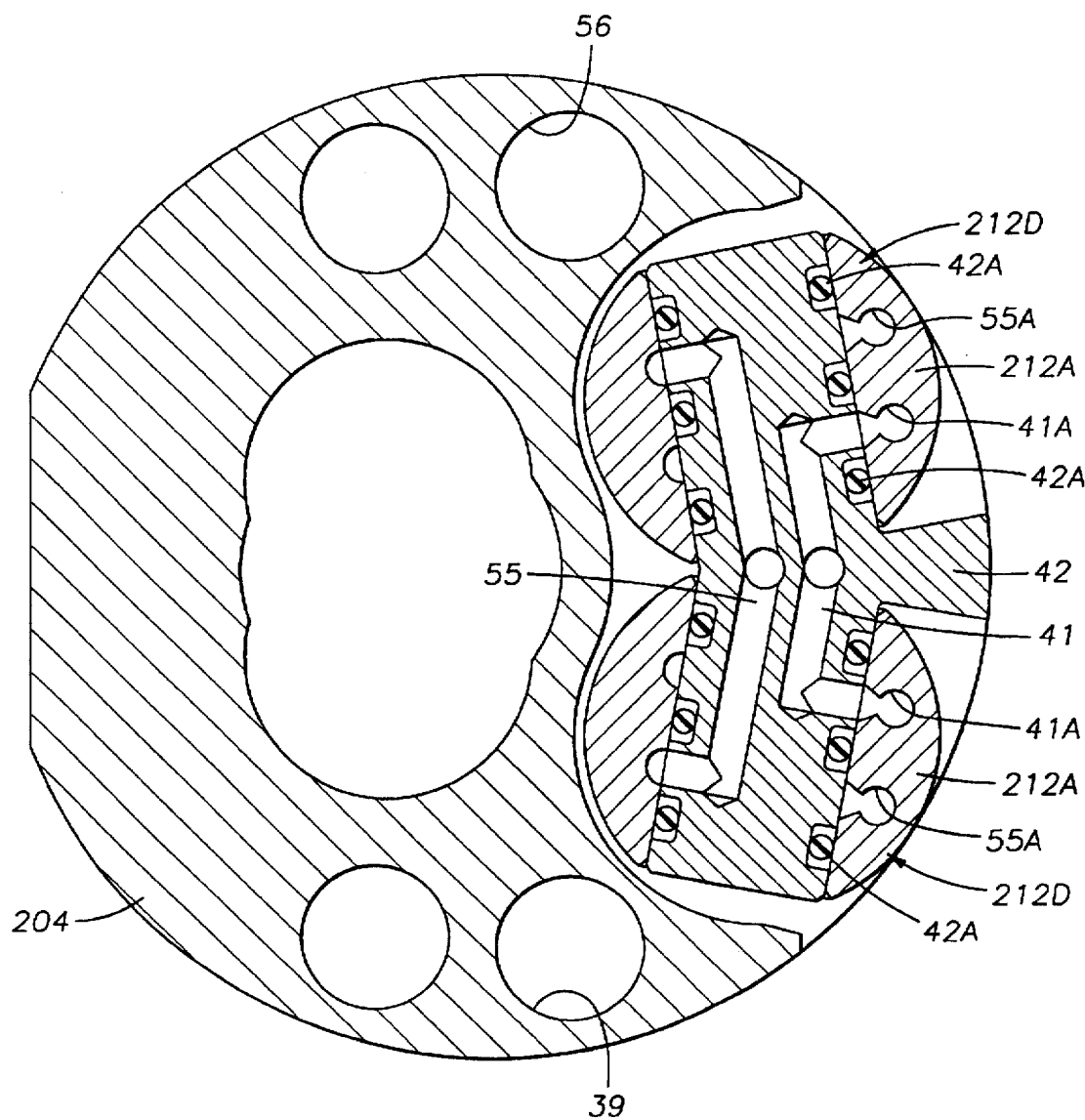
FIG. 3B shows an alternative configuration of the pivot shown in FIG. 3A.
Figure 3C:
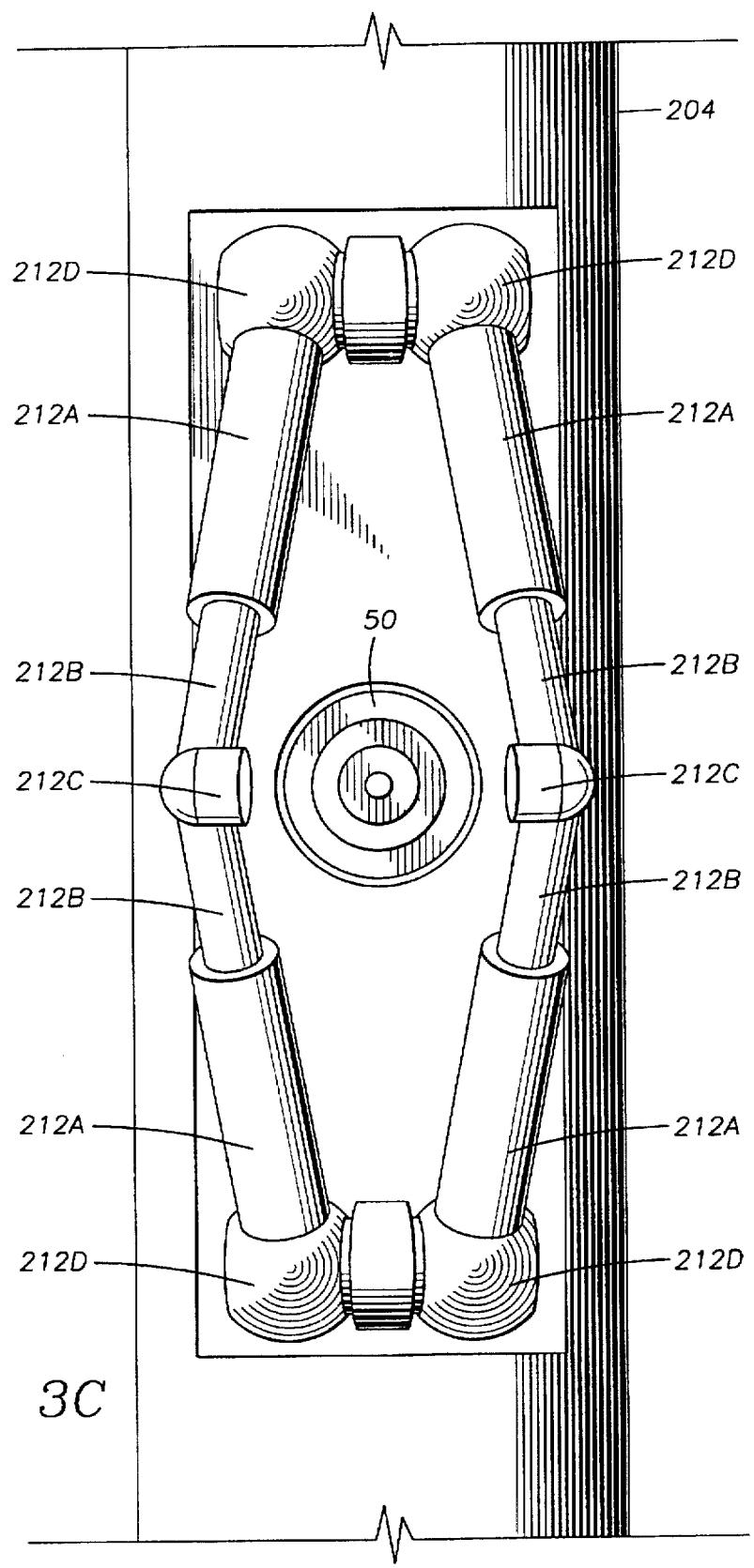
FIG. 3C shows the manner of extension of one of the locking arms which is attached to the alternative pivots as shown in FIG. 3B.

As previously described herein, the uppermost arm (212AA in FIG. 1B) and the lowermost arm (212FF in FIG. 1B) can have a slightly different configuration from the intermediate arms (212BB, 212CC, 212DD and 212EE in FIG. 1B). The alternative configuration particularly includes an alternative type pivot 212D. An alternative pivot 212D is shown in FIG. 3B. The pivot 212D shown in FIG. 3B includes an angled pivot block 42. Opposing pairs of cylinders 212A and pistons 212B attached to the pivot 212D shown in FIG. 3B can include a separate center pivot 212C for each corresponding opposing pair of pistons 212B. As the cylinders 212A and pistons 212B attached to opposite sides of the angled pivot block 42 are hydraulically extended, a distance between the center pivots 212C of each opposing pair of pistons 212B will increase. Operation of the cylinders 212A, pistons 212B and center pivots 212C of the uppermost 212AA and lowermost 212FF arms can be better understood by referring to FIG. 3C. FIG. 3C shows how the center pivots 212C are caused to move away from each other as the cylinders 212A and pistons 212B are extended and rotate along the angle subtended by the angled pivot block (42 in FIG. 3B). In the present embodiment, the angle subtended by the angled pivot block can be about 30 degrees. The subtended angle is provided only as an example and is not to be construed as a limitation on the invention. The configuration of the uppermost arm 212AA and lowermost arm 212FF, the operation of which is shown in FIG. 3C, is provided to more precisely position the mandrel 204 in a desired rotary orientation so that the longitudinal axis of the electrodes (208 in FIG. 1A) will be substantially perpendicular to a tangent of the wall of the casing (202 in FIG. 1A) when the arms 212AA-212FF are extended.

Referring once again to FIG. 3B, the pivot 212D including the angled pivot block 42 can also comprise o-rings 42A or similar seals to enable axial rotation of the cylinders 212A about the axes of the angled pivot block 42, while simultaneously enabling flow of hydraulic fluid to extension 41A and retraction 55A passages in the cylinders 212A. Hydraulic operation of the pivot 212D in FIG. 3B is substantially the same as hydraulic operation of the pivot 212D shown in FIG. 3A. It is to be understood that providing pivots 212D as shown in FIG. 3B only on the uppermost arm 212AA and lowermost arm 212FF is a matter of convenience for the system designer, and is not to be construed as a limitation on the present invention. It is contemplated that all the arms 212AA-212FF could include pivots 212D as shown in FIG. 3B having the angled pivot blocks 42. It is further contemplated that the arms having the angled pivot blocks 42 in their respective pivots 212D could comprise any or all of the intermediate arms 212BB, 212CC, 212DD, 212EE.

Figure 2:
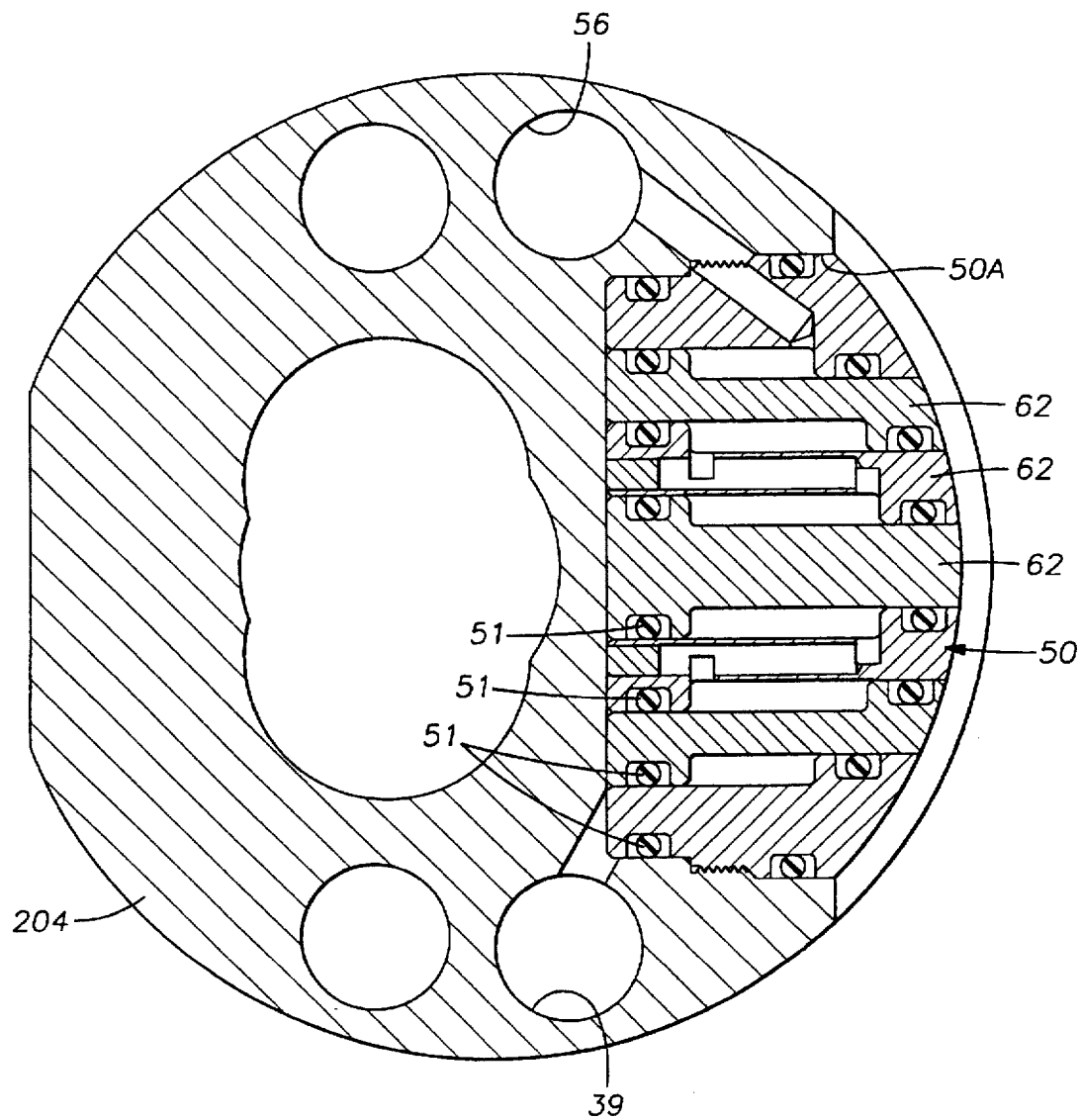
FIG. 2 shows a "kick-off" assembly used to extend locking arms from a mandrel and to hold the mandrel against the wall of a small diameter casing.

As can be observed by referring to FIG. 2, and to FIGS. 3A and 3B, application of hydraulic fluid pressure to the first extension hydraulic line 39 will simultaneously cause extension of the kick-off assemblies 50 and the pistons 212B in the arms 212AA-212FF. Similarly, application of hydraulic pressure to the first retraction hydraulic line 56 will cause simultaneous retraction of the kick-off assemblies 50 and the pistons 212B in the arms 212AA-212FF. It is to be understood that the hydraulic configuration described in FIGS. 2, 3A and 3B, including coupling of both the kick-off assemblies 50 and the pistons 212B to common hydraulic lines 39, 56 is a matter of convenience for the system designer and is not to be construed as a limitation on the present invention.

Figure 4:
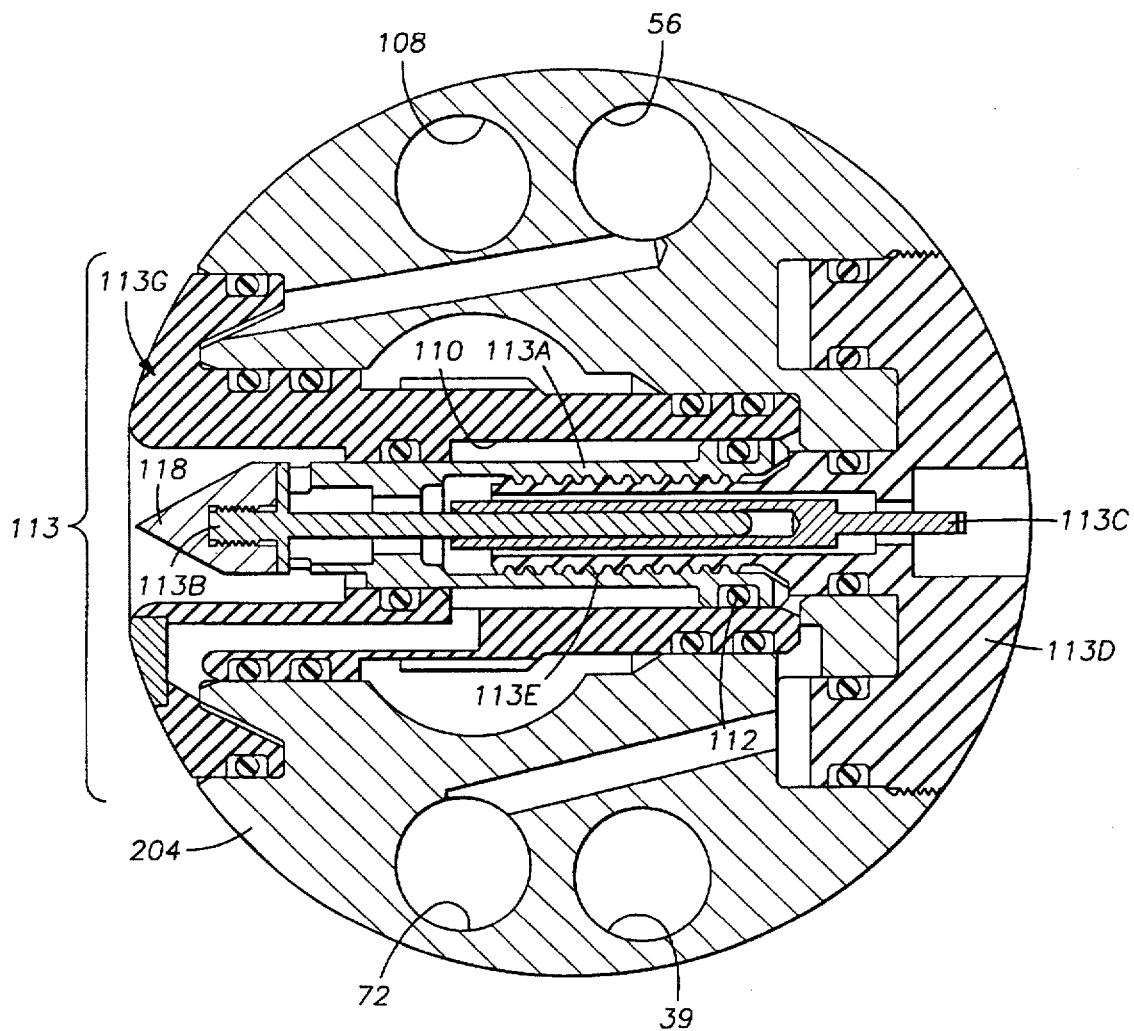
FIG. 4 shows a detailed cross-section of an electrode assembly.

A more detailed cross-sectional view of one of the electrodes 208 can be observed by referring to FIG. 4. An electrode piston assembly, shown generally at 113, can include a piston body 113A. The piston body 113A is preferably formed from metal such as steel and is typically disposed inside a mating cylinder 110 formed into an electrode homing 113G inserted into the mandrel 204. The piston body 113A can be sealed on one side by an o-ring 112 or similar sealing device. Hydraulic fluid pressure can be selectively applied from a second extension hydraulic line 72 to the back side of the piston body 113A to cause extension of the piston 113. Hydraulic fluid pressure can also be selectively applied through a the retraction hydraulic line 56 to the other side of the o-ring 112, and thereby to the front side of the piston body 113A causing the piston 113 to retract. In the present embodiment of the invention, the electrodes 208 used to inject electrical current into the casing can be extended from the mandrel independently of the electrodes 208 used to make voltage drop measurements. In the present embodiment, the voltage measurement electrodes can be in hydraulic communication on the back side of their respective pistons 113 with a third extension hydraulic line, shown at 108.

The piston assembly 113 can also include an electrical contactor 113B disposed inside the piston body 113A. The contactor 113B can make sliding electrical contact to a fixed contactor, shown at 113C, throughout the extension range of the piston body 113A. The fixed contactor 113C is affixed generally in the center of a sealing cap 113D attached to the backside of the cylinder 110. The piston body 113A can also include a replaceable electrode tip 118 affixed to the end of the contactor 113B. The tip 118 is impressed onto the wall of the casing (202 in FIG. 1A) when the piston body 113A is extended. The electrode tip 118 preferably is formed from a wear resistant alloy and can include a sharpened point or other suitable shape formed into the surface which contacts the casing (202 in FIG. 1A) in order to more effectively penetrate non-conductive corrosion or scale which may accumulate on the interior surface of the casing 202. The cap 113D and fixed contactor 113C form an electrically insulating mechanical connection to the mandrel 204 so that the electrode contactor 113C is electrically isolated both from the mandrel 204 and from every other electrode in the apparatus (10 in FIG. 1A). If desired by the system designer, the piston body 113A and the cap 113D can include mating threads, shown generally at 113E. The mating threads 113E cause the piston body 113A to rotate about its longitudinal axis when it is extended. Rotation of the piston body 113A, and thereby the electrode tip 118 attached to it, can improve the electrical contact between the casing 202 and the electrode tip 118 in the event that the casing 202 has corrosion, scale or other non-conductive material deposited on its inner wall surface.

Figure 5A:
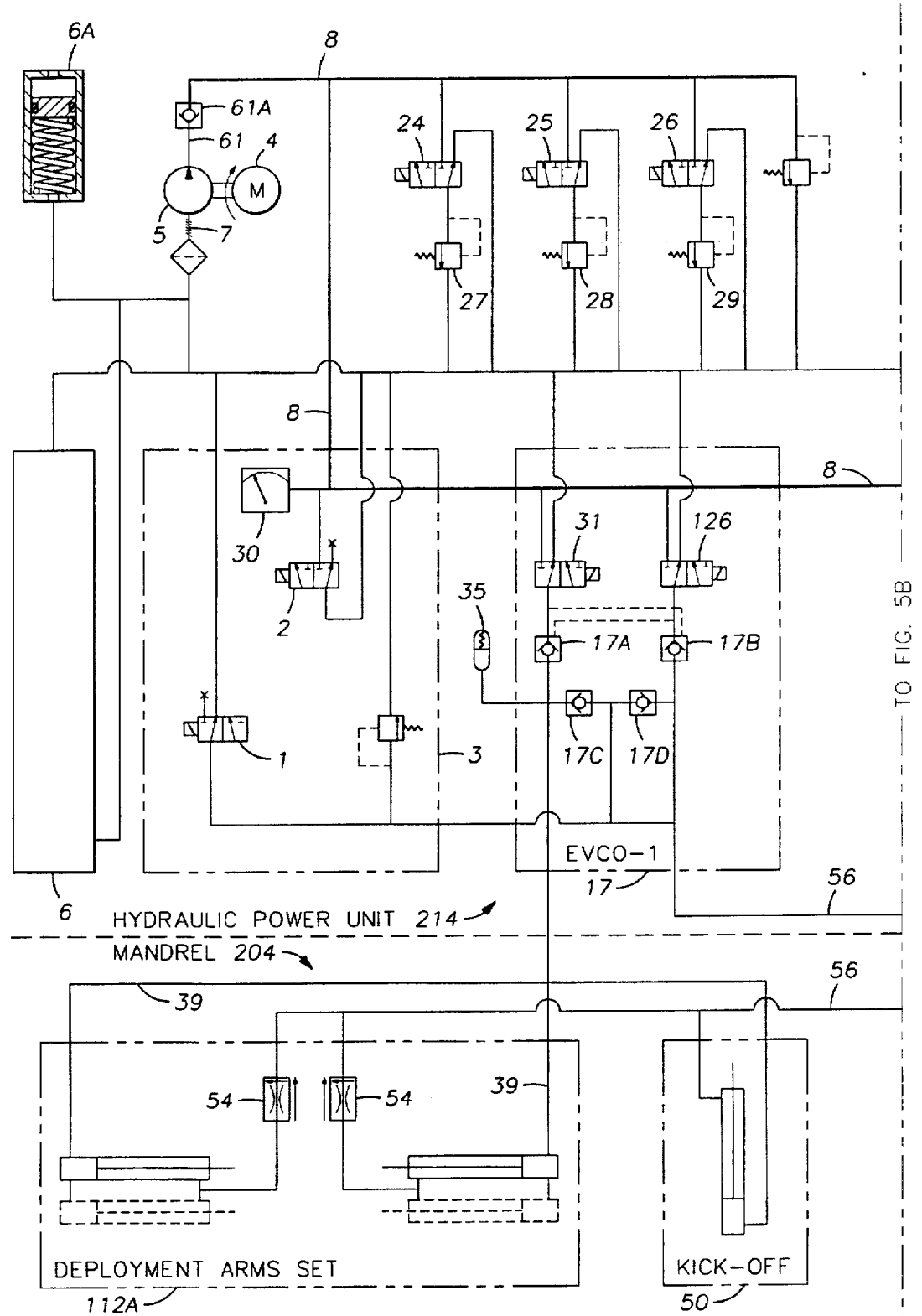
FIGS. 5A and 5B show a functional block diagram of the hydraulic system of the present invention.
Figure 5B:
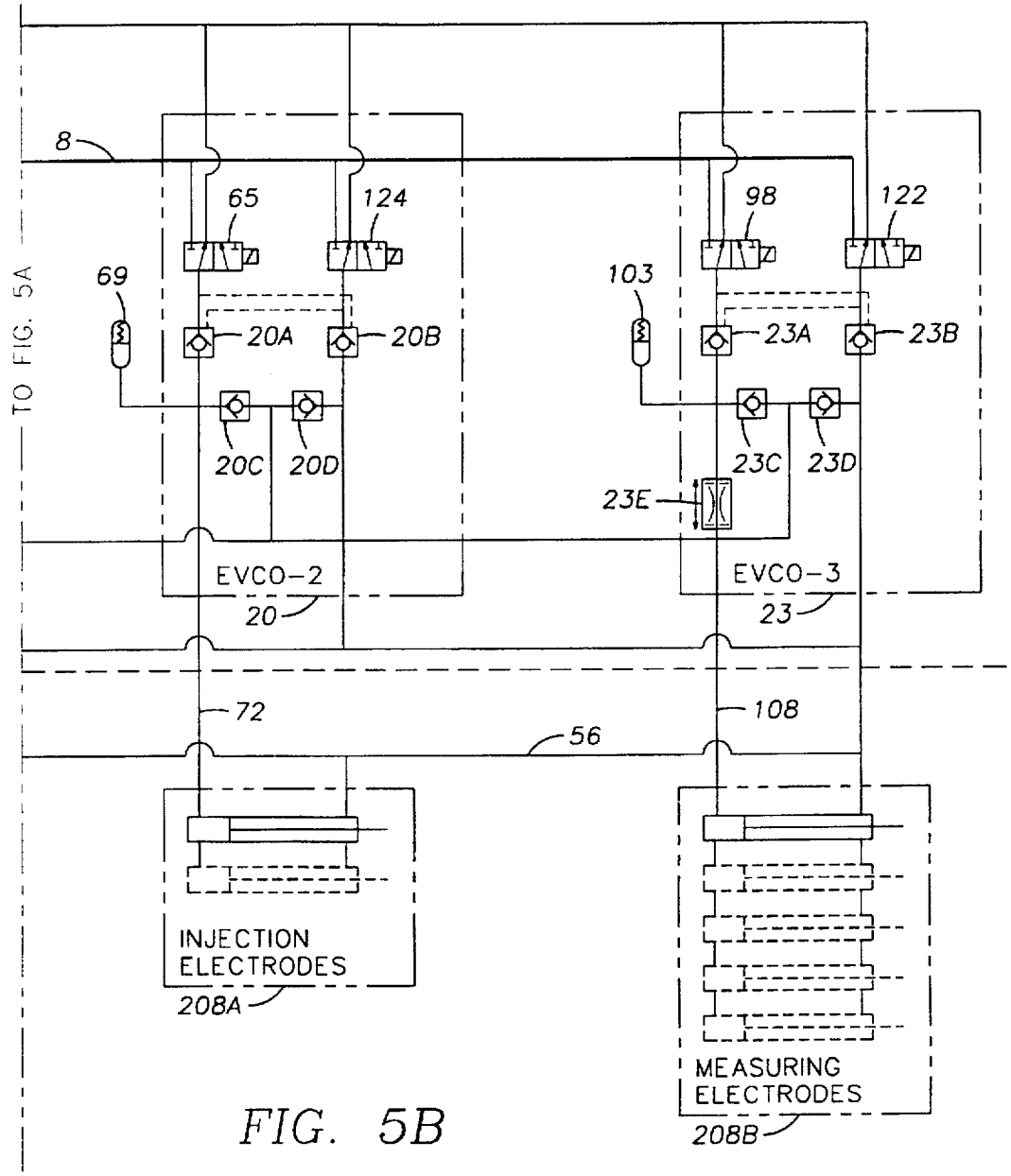

FIGS. 5A and 5B show a detailed functional block diagram of the hydraulic system, of the present invention. Referring to FIG. 5A, an hydraulic oil reservoir, shown at 6, can be disposed within the hydraulic power unit (shown as 214 in FIG. 1A). The reservoir 6 can include a pressure compensating piston 6A. The pressure compensating piston 6A can be biased by means of a spring or similar device. One side of the piston 6A is exposed to the fluid pressure inside the casing (shown as 202 in FIG. 1A). The piston 6A transfers the fluid pressure inside the casing 202 to the interior of the reservoir 6 to prevent failure of the hydraulic or electrical components of the instrument (shown as 10 in FIG. 1) under hydrostatic pressure, as is understood by those skilled in the art. The reservoir 6 is hydraulically connected to the intake side 7 of an hydraulic oil pump 5 which can also be disposed in the hydraulic power unit (214 in FIG. 1A).

The pump 5 preferably is operated by an electric motor 4. The motor 4 can also form part of the hydraulic power unit 214. The pump discharge line 61 can be conducted through a check valve 61A to a main pressure line 8. All the hydraulically operated functions of the instrument (10 in FIG. 1) can draw hydraulic operating pressure from the main pressure line 8.

The amount of hydraulic fluid pressure present in the main pressure line 8 can be controllably regulated for performing the functions of extending and retracting the applicable components of the instrument 10. The amount of hydraulic pressure can be selected by the system operator and is controlled by a plurality of parallel-connected pressure relief valves, shown at 27, 28 and 29. Each one of the pressure relief valves 27, 28, 29 can be set to vent hydraulic pressure from the main pressure line 8 back to the reservoir 6 at a different preselected hydraulic pressure. Each pressure relief valve 27, 28, 29 can be connected to the main pressure line 8 by a corresponding solenoidoperated, selective hydraulic valve, such as those shown at 24, 25 and 26. Each solenoid valve 24, 25, 26 can be electrically connected to the telemetry/control unit (216 in FIG. 1A) whereby each valve (24, 25 or 26) can be operated when an actuation voltage is conducted to the selected valve (24, 25 or 26) from the controller (216 in FIG. 1A). The amount of hydraulic operating pressure in the main pressure line 8 can be selected by the system operator entering appropriate control signals into a surface control unit (not shown in FIGS. 5A and 5B) disposed at the earth's surface and electrically connected to the cable (206 in FIG. 1A). The command signals can be decoded in the telemetry/control unit (216 in FIG. 1A) to cause the telemetry/control unit 216 to conduct the control voltage to the selected solenoid valve 24, 25, 26, thereby hydraulically connecting the corresponding pressure relief valve 27, 28, 29 between the main pressure line 8 and the reservoir 6. Selectable hydraulic pressure in the main pressure line 8 is provided in the present invention to reduce the possibility of damage to the casing (202 in FIG. 1A) or to the instrument (10 in FIG. 1A) by application of excessive force by the electrodes or the arms (12 in FIG. 1A). Preventing application of excessive force to the casing (202 in FIG. 1A) is desirable particularly if the casing 202 may be worn, corroded or otherwise damaged. If the system operator determines, as will be further explained, that more hydraulic pressure is needed to properly extend the arms (212AA-212FF in FIG. 1A) or the electrodes (208 in FIG. 1A), then the system operator can select the valve, such as 25 or 26 (interconnecting to the corresponding relief valve 28, 29), to produce the next higher preselected pressure level in the main pressure line 8. As will also be further explained, selection of the appropriate valve 24, 25, 26 can also be performed automatically by the controller 216 in response to measurements of contact impedance of the electrodes 208 to the casing 202.

Also connected to the main pressure line can be a pressure transducer 30 and a "soft start" solenoid valve 2, which is also connected to the reservoir 6. The transducer 30 generates a signal corresponding to the hydraulic fluid pressure in the main pressure line 8. The soft start valve 2 can be selected to shunt the main pressure line 8 to the reservoir 6 until an appropriate control command is decoded by the telemetry/controller 216. The operation of the transducer 30 and the soft start valve 2 will be further explained.

The instrument 10 is typically deployed first by extending the kick-off assemblies (50 in FIG. 2) and the arms (212AA-212FF in FIG. 1A). Extension and retraction of the arms 212AA-212FF and kick-off assemblies 50 can be controlled by a valves in a first event controller trait (EVCO) 17. The first EVCO 17 can include an extension control valve 31 hydraulically interconnected between the main pressure line 8 and the previously described first extension hydraulic line 39. The first EVCO 17 can also include a retraction control valve 126 hydraulically interconnected between the main pressure line 8 and the first retraction hydraulic line 56. Both control valves 31, 126 can be electric solenoid-operated valves similar in design to the other previously described solenoid-operated valves used to control the pressure in the main pressure line 8. Control valves 31, 126 can operate upon being sent an actuation voltage from the controller 216 when the controller 216 decodes the appropriate command signals transmitted from the earth's surface. The control valves 31, 126 are also connected to the respective hydraulic lines 39, 56 through pilot-operated check valves 17A, 17B. The pilot-operated check valves 17A, 17B enable the hydraulic line which is not selected to be pressurized to be vented to the reservoir 6. For example, if the first extension line 39 is selected to be pressurized, then check valve 17B is operated to enable venting the retraction line 56 to the reservoir 6. The extension line 39 is vented to the reservoir 6 upon pressurizing the retraction line 56 by operation of check valve 17A. Venting the unpressurized line to the reservoir 6 enables fluid discharged from the unpressurized side of the arms (212AA-212FF in FIG. 1A), kick-off assemblies (50 in FIG. 2) and electrodes (208 in FIG. 1A) to return to the reservoir 6 relatively unimpeded.

As previously explained, the soft start valve 2 is initially selected to vent substantially all the hydraulic pressure in the main line 8 to the reservoir 6 when a deployment or retraction sequence is initiated. The motor 4 is then started, which initiates the pump 5. The soft-start valve 2 is then selected to close, thereby enabling hydraulic pressure to build up in the main pressure line 8. The desired operating pressure is then selected by operating the appropriate solenoid valve 24, 25 or 26. The hydraulic pressure in the main line 8 can be verified by observing the pressure as measured by the transducer 30. The extension control valve 31 in the first EVCO 17 can then be selected to extend the arms 212AA–212FF and the kick-off assemblies 50. As pressure builds up in the main pressure line 8 the arms 212AA–212FF and kick-offs 50 begin to extend. Using the soft start valve 2 reduces the possibility of damage to the arms 212AA–212FF, the kick-off assembles 50, and particularly the motor 4 and pump 5 by application of full hydraulic pressure substantially instantaneously.

During extension of the arms 212AA–212FF, the volume rate at which hydraulic oil discharges from the unpressurized side of the cylinders 212A into the retraction line 56 can be regulated by flow-controllers, shown at 54. The flow controllers 54 are of a type known in the art and enable the arms 212AA–212FF to extend and retract substantially synchronously. The flow controllers 54 need only be hydraulically interposed between the retract hydraulic line 56 and the cylinders 212A to perform the required function. The physical location of the flow controllers 54 is a matter of convenience for the system designer. Synchronous extension and retraction of the arms 212AA–212FF enables the instrument 10 to be deployed substantially coaxially with the casing (2 in FIG. 1A) under any condition of uneven mechanical loading on the arms 212AA–212FF such as can be caused by inclination from vertical, or conditions of accumulation of dirt, scale, etc. on one of the arms 212AA–212FF which might affect the rate at which that arm can extend or retract.

The transducer 30, as previously explained, generates signals corresponding to the amount of hydraulic pressure in the main pressure line 8. The signals can be transmitted to the surface by the telemetry/controller (216 in FIG. 1A) for observation by the system operator. Alternatively, the signals can be received by the controller 216 to automatically cause the controller 216 to operate the appropriate control valve in the first EVCO 17 so as to stop application of additional hydraulic pressure to the extension hydraulic line 39 and to initiate the next part of the instrument 10 deployment sequence.

The system operator can, upon observation of the main line 8 pressure reaching the selected control pressure, or automatically the controller 216 can, next select the electrodes (208 in FIG. 1A) to extend. Automatic control by the controller 216 can be performed by a software program resident in the controller 216 which selects the next part of the deployment sequence when the pressure in the main line 8 reaches the selected control pressure. Hydraulic pressure can be maintained in the arms 212AA–212FF and the kick-offs 50, during extension of the electrodes 208 (and during a measurement, when electrical power to the motor 4 is typically turned off) by a first accumulator 35 connected to the extension discharge side of the first EVCO 17.

Referring now to FIG. 5B, after the arms 212AA–212FF and kick-off assemblies 50 have been extended, the sequence of events in which the instrument 10 is deployed to make measurements continues with extension of the electrodes 208. In the present embodiment of the invention, extension and retraction of the electrodes 208 can be performed in two steps, the first being to extend the electrodes referred to as "current injection electrodes", and shown in FIG. 5B as 208A. Extension and retraction of the current injection electrodes 208A can be controlled by extension 65 and retraction 124 control valves in a second EVCO 20. The second EVCO 20 can be substantially the same in design as the first EVCO 17. The second EVCO 20 can include pilot operated check valves 20A, 20B, similar to the ones in the first EVCO (17 in FIG. 5A), for selectively venting the unpressurized side of the injection electrodes 208A to the reservoir (6 in FIG. 5A).

Extension and retraction of the "measuring electrodes", shown at 208B, can be separately controlled by corresponding valves 98, 122 in a third EVCO 23. The third EVCO 23 can be similar in design to the first 17 and second 20 EVCO's and can include pilot operated check valves 23A, 23B to selectively vent the unpressurized side of the measuring electrodes 208B to the reservoir 6. It is to be understood that the particular combination of extension and retraction control for the electrodes 208A, 208B in the present embodiment is a matter of convenience for the system designer and is not to be construed as a limitation on the invention.

When the injection electrodes 208A are selected to be extended, the extension control valve 65 in the second EVCO 20 connects the main pressure line 8 to the extension hydraulic line of the injection electrodes 208A, this line being shown at 72 in FIG. 5B. Pressure can build in the main pressure line 8 until the pressure in the main line 8 reaches the preselected control pressure and the injection electrodes 208A are extended. Hydraulic pressure can be maintained on the injection electrodes 208A by a second accumulator 69 which is hydraulically connected to the injection electrode extension hydraulic line 72.

The process of deploying the instrument can continue with extending the measurement electrodes 208B. Extending the measurement electrodes 208B can be performed by operating the extension control valve 98 in the EVCO 23. Operating the extension control valve 98 in the third EVCO 23 selectively interconnects the main pressure line 8 to the third extension hydraulic line 108. The third extension hydraulic line 108 is hydraulically connected to the extension side of the measure electrodes 208B. Pressure can be maintained on the measurement electrodes 208B by a third accumulator 103 connected to the measurement electrode extension hydraulic line 108. Pilot operated check valves 23A, 23B in the third EVCO 23 selectively vent the unpressurized side of the measure electrodes 208B to the reservoir 6.

When the electrodes 208A, 208B are fully extended, the motor 4 is typically turned off so that electrical measurements can then be made. The electrical measurements will be further explained.

After the electrical measurements are completed, or at any other time when the system operator desires to move the instrument, the electrodes, 208A, 208B, the arms 212AA–212FF and the kick-off assemblies 50 can be selectively retracted by operating the corresponding retraction valves in the respective EVCO's 17, 20, 23. Retracting the arms 212AA–212FF and kick-offs 50 can be performed by selecting the retraction valve 126 in the first EVCO 17, which connects the main pressure line 8 to the retract hydraulic line 56. When the hydraulic pressure builds it causes the 212AA–212FF and kick-off assemblies 50 to retract. When the retract valve 126 in the first EVCO 17 is operated, the correspondingly connected pilot operated check valve 17A is opened, enabling hydraulic fluid on the extension side of the arms 212AA–212FF and kick-offs 50 to be vented to the reservoir 6. The other pilot operated check valves 20A, 23A in the second 20 and third 23 EVCO's remain closed, so the hydraulic fluid present in the extension side of the injection electrodes 208A and the measuring electrodes 208B remains trapped therein, preventing their retraction. The pilot operated check valves 17A, 20A, 23A enable the single retract hydraulic line 56 to be interconnected to the retract side all of the electrodes, arms and kick-offs, but retain individual retraction control of these elements as described herein.

When the system operator desires to move the instrument, it is desirable to retract the arms 212AA–212FF, the kick-off assemblies 50, the injection electrodes 208A and the measuring electrodes 208B. The retraction sequence preferable begins with opening of the soft start valve 2 to vent pressure to the reservoir 6. The soft start valve 2 is then closed, the motor 4 is started, and pressure can build in the main pressure line 8, which can be verified by observing the pressure measured by the transducer 30. The measure electrodes 208B can be retracted by operating the retraction control valve 122 in the third EVCO 23. Valve 122 is closed when the electrodes 208B are determined top be retracted by observation of the hydraulic pressure. As with extension, the controller 216 can be programmed to automatically perform the next step in the retraction sequence when the hydraulic pressure reaches a predetermined value.

The injection electrodes 208A can then be retracted by operating the retraction control valve 124 in the second EVCO 20. Upon retraction, valve 124 is closed. Finally, the arms 212AA–212FF can be retracted by operating the retraction control valve 126 in the first EVCO 17. In the present embodiment, full retraction of the arms 212AA–212FF is typically unnecessary when moving the instrument 10 to a new depth within the casing 202 at which it is desired to make electrical measurements. The arms 212AA–212FF need only be retracted enough to enable unimpeded movement of the instrument through the casing 202. This procedure is provided to save considerable operating time while conducting resistivity measurements with the apparatus of the present invention.

The hydraulic system of the present embodiment can include a safety feature to allow for the possibility of failure of electrical power to be transmitted to the instrument 10, which as is understood by those skilled in the art may occur if the instrument 10 must be withdrawn from the wellbore (2 in FIG. 1A) by means other than the cable (206 in FIG. 1A), such as when the instrument 10 may become stuck in the casing 202 and must be retrieved in a procedure known in the art as "fishing". An emergency collapse valve 1, which can also be a solenoid-operated valve similar to the other solenoid operated valves in the instrument 10, can be interconnected between the extension and retraction hydraulic lines of the electrodes 208A, 208B, the arms 212AA–212FF and the kick-off assemblies 50. Failure of electrical power causes the emergency collapse valve to vent all of the extension and retraction hydraulic lines to the reservoir 6 simultaneously. Venting all the extension and retraction lines to the reservoir 6 simultaneously enables substantially free movement, particularly collapse under mechanical compression, of the arms 212AA–212FF, the electrodes 208A, 208B and kick-off assemblies 50. During normal operation of the instrument 10, the emergency collapse valve 1 remains closed, so that pressure can build in the line 58 connecting the emergency collapse valve 1 to the EVCO's 17, 20, 23. This pressure closes check valves, such as 17C, 17D in the first EVCO 17 (and corresponding check valves in the second 20 and third 23 EVCO's) enabling build up of the operating hydraulic pressure in the appropriate hydraulic lines.

A further safety feature provided in the present embodiment of the invention is a thermal relief valve 201 which can be included to vent hydraulic pressure in the system to the reservoir 6 if the hydraulic oil should become over pressured due to thermal expansion. The thermal relief valve 201 can reduce the possibility of damage to hydraulic components in the instrument 10 from overpressurization of the hydraulic oil.

U.S. Pat. No. 5,075,626 issued to Vail describes a principle of measurement of electrical resistivity of earth formations from within a conductive casing inserted in a wellbore penetrating the earth formations. The apparatus of the present invention can be electrically configured to operate according to the measurement principle described in the Vail '626 patent. The measurement principle described in the Vail '626 patent includes injecting electrical current into the casing and making voltage drop measurements at spaced apart locations along the casing. While current is being injected and voltage drop is being measured, the apparatus is maintained in a substantially fixed position within the casing.

The apparatus of the present invention is intended to overcome some of the mechanical and electrical limitations of the apparatus disclosed in the Vail '626 patent, as described in the Background of the Invention section herein, while substantially preserving the capability of making resistivity measurements according to the measurement principle disclosed in the Vail '626 patent. It is to be understood that the electrical configuration disclosed herein is provided only as an example of possible electrical configurations and is not to be construed as a limitation of the present invention.

Figures 6A, 6B:
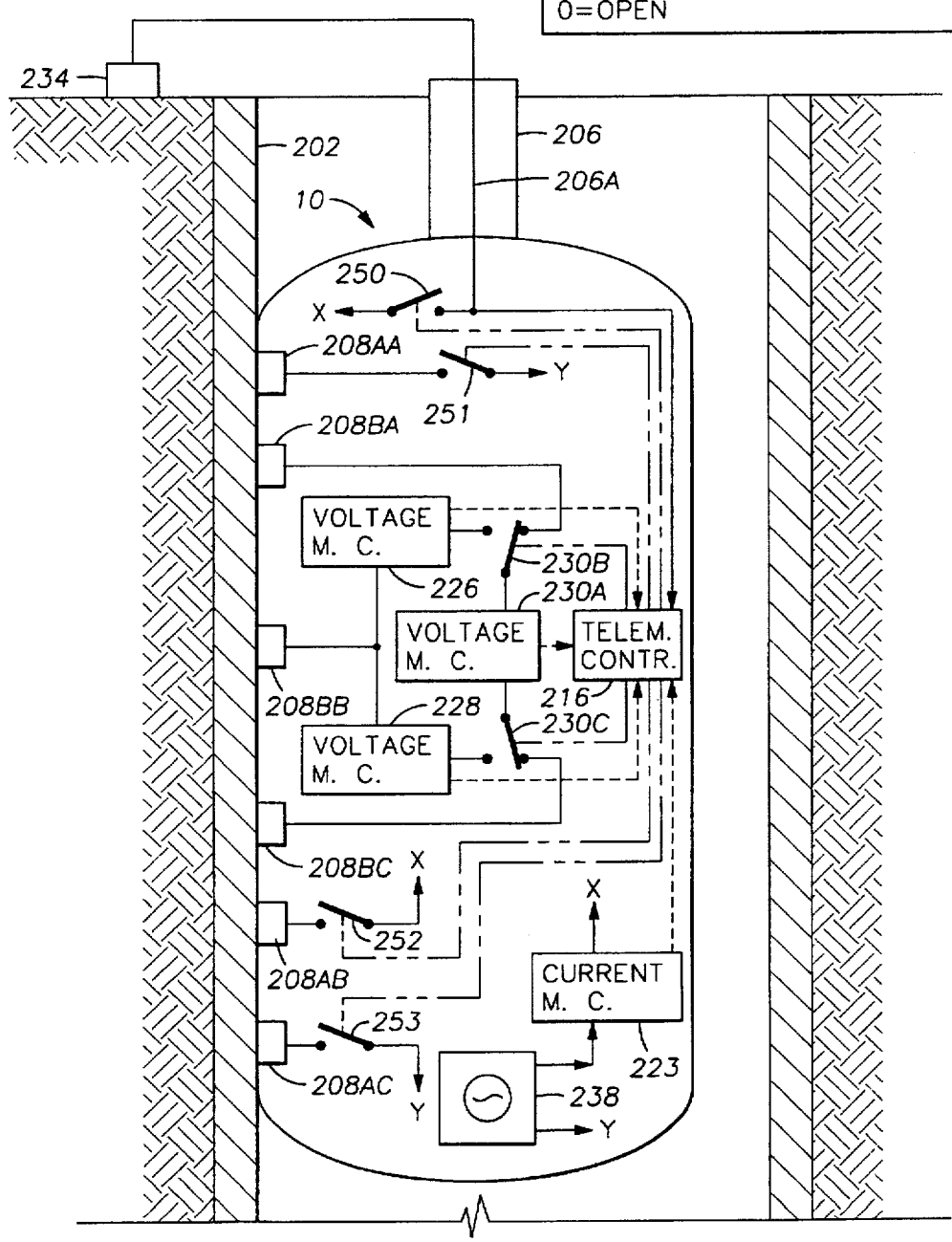
FIG. 6A shows a block diagram of the electrical voltage measuring circuits of the instrument of the present invention.
FIG. 6B shows selective switch configurations for making various voltage drop measurements using the instrument of the present invention.

The means by which the present invention makes measurements corresponding to resistivity of the earth formations outside the casing can be better understood by referring to FIG. 6A. The instrument 10 is shown in FIG. 6A as a greatly simplified block diagram in order to better explain typical circuitry and arrangements of the electrodes. The instrument 10 can include voltage measuring circuits 226, 228 and 230A. Voltage measurements made by the circuits 226, 228, 230A are conducted to the telemetry/controller unit 216 for transmission of the measurements to the earth's surface for observation and recording. The voltage measuring circuits 226, 228, 230A each preferably include an analog to digital converter (not shown) so that the measurements transmitted to the earth's surface are in digital form. Having analog to digital converters in the measuring circuits 226, 228, 230A is a matter of convenience for the system designer and is not to be construed as a limitation on the invention.

Measuring circuits 226 and 228 can be interconnected, respectively, across measuring electrodes 208BA, 208BB and 208BB, 208BC, and are adapted to measure the voltage between those electrodes. Measuring circuit 230A can be selectively connected, by means of switches 230B and 230C, either across measuring electrodes 208BA and 208BC, or to measure a second difference of voltages between measuring circuits 226 and 228. Typically, measuring circuit 230A will be selected to measure voltage drop between electrodes 208BA and 208BC during measurement of the resistance of the casing 202. Measuring circuit 230A is typically selected to measure the second difference in voltages when voltage drop (current leakage) along the casing 202 is being measured. Switches 230B and 230C can be telemetrically controlled switches of a type known in the art adapted to operate on receiving a control signal from the controller 216. The control signal can be generated in response to receipt of an appropriate command signal from the earth's surface.

A source of electrical current 238 disposed in the instrument can be an alternating current source having a frequency typically not more than 15 Hz and preferably about 0.5 Hz. The output terminals of the source, shown at X and Y, can be selectively connected between different electrodes, including injection electrodes 208AA, 208AB and 208AC disposed on the instrument 10, and through an armored electrical conductor 206A in the cable 206, to a return electrode 234 disposed at the earth's surface. Selective connection of the source 238 can be performed by telemetrically controlled switches 250, 251,252 and 253. The amount of current generated by the source 238 can be measured by a current measuring circuit 223.

Measurements which can determine the resistivity of the earth formation are described, for example, in U.S. Pat. No. 5,075,626 issued to Vail. As described in the Vail '626 patent, three measurements can be used to determine the resistivity of the earth formation behind the casing. First, the casing resistance is measured by injecting measured current between electrodes 208AA and 208AC and measuring the voltage between the respective measuring electrodes 208BA, 208BB, 208BC. Second, the characteristic impedance of the casing and the earth is measured between the surface and the depth in the wellbore at which the tool is deployed. In this measurement, current is injected between electrodes 208AB and 208AC and voltage drop between respective measuring electrodes is measured. Finally, the "leakage current" along the casing is measured by measuring voltage drop between the respective measuring electrodes as before, and injecting current between electrode 208AA on the instrument and the return electrode 234 at the earth's surface. The three sets of measurements are combined to determine formation resistivity.

A table of operating positions for switches 250, 251,252 and 253 for each one of the three measurements described herein is shown in FIG. 6B. It is to be understood that the present embodiment of the invention is not meant to be an exclusive representation, but is meant to serve as an example, of means for making the measurements used to determine resistivity of the earth formations from inside conductive casing. Other arrangements of electrodes 208AA, etc. and the source of electrical current 238 can also be used to determine the resistivity of the formation as is understood by those skilled in the art.

Figure 7:
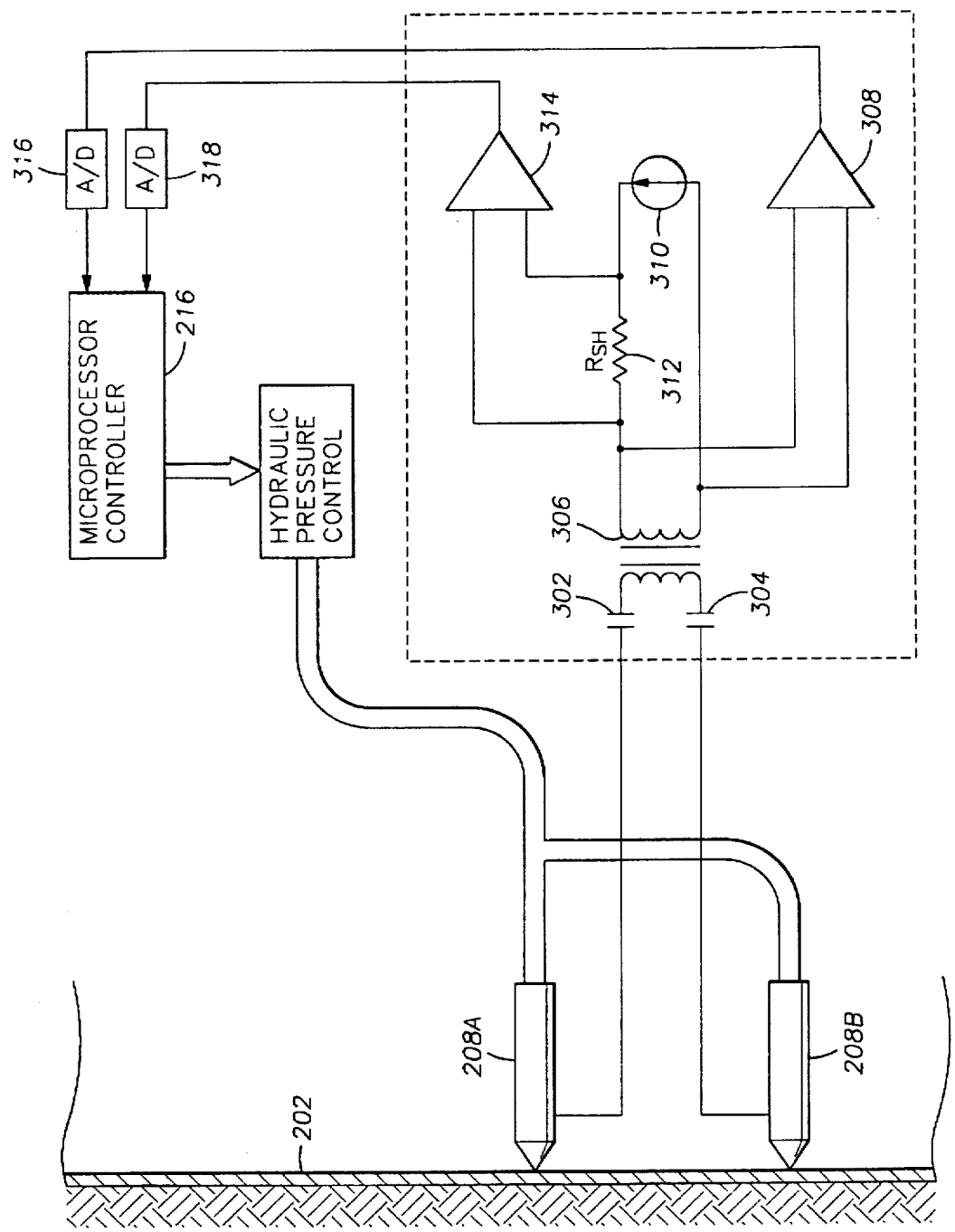
FIG. 7 shows a functional block diagram of a system for automatically adjusting contact pressure of the electrodes in response to measurements of contact impedance of the electrodes.

Means by which contact impedance of the electrodes (208 in FIG. 1A) can be made and these measurements used to adjust the contact pressure of the electrodes (208 in FIG. 1A) can be better understood by referring to FIG. 7. Electrical impedance of a circuit, which will be further explained, including a segment of the casing 202 can be measured through pairs of electrodes, such as shown at 208A and 208B. The impedance is measured at a frequency preferably about 1000 Hz to avoid interference with relatively low frequency (typically less than 15 Hz) electrical current used to measure resistivity of the earth formation. Using a different frequency from the formation resistivity measuring current to measure contact impedance enables the impedance measuring circuit to remain continuously connected to the electrodes 208A, 208B.

Electrode 208A can be coupled to the secondary winding of a transformer 306 through a first high pass filter 302. Electrode 208B can similarly be coupled to the secondary winding of the transformer 306 through a second high pass filter 304. The primary winding of the transformer 306 is coupled to an oscillator 310 through a shunt resistor 312. The oscillator 310 preferably has a frequency of about 1000 Hz which is high enough to avoid interference with the low-frequency formation resistivity measuring current, but is also low enough so not to cause the current flowing between the electrodes 208A, 208B to undergo substantial "skin-effect". High pass filters 304, 306 are adapted to exclude the formation resistivity measuring current, but to enable relatively unimpeded passage of the current from the oscillator 310. A first voltage measuring circuit 308 can be connected across the primary winding of the transformer 306 to determine the voltage applied to the electrodes 208A, 208B. A second voltage measuring circuit 314 can be connected across the shunt resistor 312 to determine the amount of current developed across the electrodes 208A, 208B. Measurement of the current developed and the voltage at which the current is developed can be used to determined the impedance in the circuit. The circuit includes the electrodes 208A, 208B, the section of casing 202 located between the electrodes 208A, 208B and the contact resistance between the electrodes 208A, 208B and the casing 202. As is understood by those skilled in the art, the impedance measured between the electrodes 208A, 208B in the case of substantially perfect electrical contact between the electrodes 208A, 208B and the casing 202 is dependent on the axial spacing between the electrodes 208A, 208B and the resistivity of the casing 202, but typically does not exceed about 100 milliohms.

The voltage measuring circuits 314, 308 preferably are connected, respectively, to analog to digital converters 318, 316. Output of the analog to digital converters 318, 316 can be connected to the controller 216. The controller 216 can include programming instructions to calculate the impedance between the electrodes 208A, 208B from the measurements of voltage and current. The controller 216 can also include programming instructions to operate, successively, solenoid valves (24, 25, 26 in FIG. 5A) which cause the main pressure line (8 in FIG. 5A) to be charged with successively higher hydraulic pressure, in the event that at any particular hydraulic pressure the impedance measurement exceeds a threshold value above which the contact impedance is determined to be unacceptably high for accurate measurements. The controller 216 can also transmit measurements of contact impedance to the earth's surface for observation and recording. It is contemplated that the measurement of contact impedance can be observed at the earth's surface by the system operator so that he may manually select higher hydraulic pressure in the main pressure line 8 by operation of the selective valves as previously explained if the contact impedance is determined to be too high.

Impedance measuring circuits such as shown in FIG. 7 can be connected across other ones of the electrodes 208 to determine the contact impedance at the other electrodes, and enable the controller 216 to adjust the hydraulic pressure in the main pressure line (8 in FIG. 5B) accordingly, or alternatively to provide the system operator with measurement of contact impedance at each pair of electrodes 208. By using circuits as shown in FIG. 7 to adjust the contact pressure of the electrodes 208, damage to the casing 202 by excessive electrode contact pressure can be minimized. It is contemplated that if the contact impedance exceeds the threshold value even at the maximum possible hydraulic pressure, as might be the case if the casing 202 is severely corroded, then the instrument (10 in FIG. 1) can be retracted and moved to a different depth within the casing 202 where better electrical contact may be possible.

The present embodiment of the invention can also include a circuit for adjusting measurements made during the steps of determining resistance of the casing (shown at 202 in FIG. 1A), characteristic impedance and formation resistivity. Referring once again to FIG. 6A, the casing resistance is determined by causing current to flow between electrodes 208AA and 208AC, and measuring the voltage drop between electrodes 208BA and 208BB, and between electrodes 208BB and 208BC. Since the current flows only through the casing 202, the current can be large enough to magnetically induce substantial eddy currents in the casing 202. The current flowing through the casing 202 can also induce parasitic voltages in the inputs of the voltage measuring circuits 226, 228, 230A. The eddy currents themselves can directly induce voltages in the voltage measuring circuits 226, 228, 230A. The voltages induced in the measuring circuits 226, 228, 230A can be substantially larger than the magnitude of the voltage drops which are intended to be measured. The induced voltages typically are 90 degrees out of phase with respect to the current flowing along the casing 202. U.S. Pat. No. 5,075,626 issued to Vail describes the use of phase sensitive detectors in the voltage measuring circuits 226, 228, 230A to exclude measurement of the induced voltages.

Figure 8:
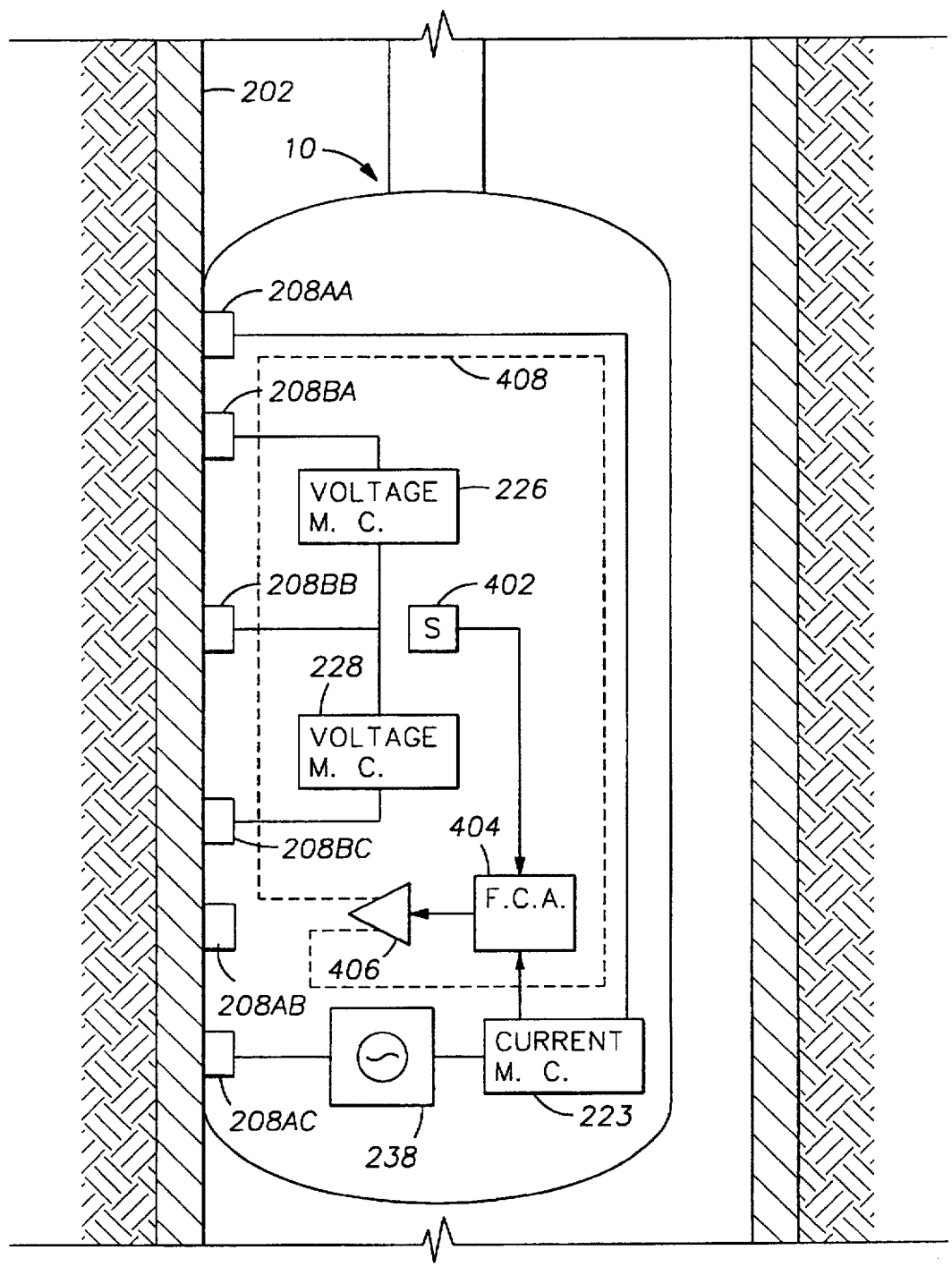
FIG. 8 shows a flux cancellation circuit used to improve the response of voltage measuring circuits in the tool.

Referring now to FIG. 8, a system will be explained which can substantially improve the performance of the voltage measuring circuits 226, 228, 230A in rejecting the eddy current and parasitically induced voltages. FIG. 8 shows the instrument 10 electrically configured to measure the resistance of the casing 202. In this electrical configuration, the electrical current source 238 is connected between injection electrodes 208AA and 208AC. The voltage measuring circuits 226 and 228 measure voltage drop between electrodes 208BA and 208BB, and 208BB and 208BC, respectively. A magnetic flux sensor 402 can be positioned inside the instrument 10 near preamplifier inputs (not shown separately) of the voltage measuring circuits 226, 228. The magnetic flux sensor 402 detects the magnetic field induced by the current flowing in the casing 202. The magnetic flux sensor 402, and the output of the current measuring circuit 223 are conducted to a feedback control amplifier 404. The feedback control amplifier 404 generates a control signal for operating a flux cancellation power amplifier 406. The output of the flux cancellation amplifier 406 comprises electrical current which is substantially opposite in phase to the output of the current source 238. The output of the flux cancellation amplifier 406 is conducted through a current loop, shown at 408, which can comprise a wire loop disposed along the length of the instrument 10 between the injection electrodes 208AA, 208AC and enclosing a plane (not shown) which is substantially coplanar with the electrodes 208AA–208AC inclusive. The current loop 408 preferably includes the axis of the mandrel (204 in FIG. 1A) within the plane of the loop 408. The current flowing through the current loop 408 is controlled in magnitude by input signals generated by the current measuring circuit 223 in response to the electrical current source 238 output, and to the amount of induced magnetic flux detected near the voltage measuring circuits 226, 228 which are conducted to the feedback control amplifier 404. The current flowing through the loop 408 is adjusted so as to substantially cancel the magnetic flux detected by the sensor 402 near the voltage measuring circuits 226, 228. Effects of induced voltage on the measuring circuits 226, 228 can thereby be substantially eliminated.

DESCRIPTION OF ALTERNATIVE EMBODIMENTS

An alternative embodiment of the invention which can reduce the amount of operating time needed to determine earth formation resistivity can be observed by referring to FIG. 9A. The mandrel 204 in the alternative embodiment can include two current injection electrodes 208AA and 208AB, and can include five voltage measurement electrodes, shown at 208BA through 208BE.

The instrument 10 in the alternative embodiment can also include four voltage measuring circuits, shown generally at 226, 226A, 228, 228A. The voltage measuring circuits in the alternative embodiment can be substantially the same as the voltage measuring circuits in the first embodiment of the invention. Voltage measuring circuit 226 is shown interconnected between measuring electrodes 208BA and 208BB. Voltage measuring circuit 228 is shown interconnected between measuring electrodes 208BB and 208BC. Measuring electrodes 208BA, 208BB and 208BC can be axially spaced apart along the mandrel at substantially the same spacing as the measuring electrodes in the first embodiment.

Measuring electrode 208BE can be positioned above electrode 208BA at a spacing substantially the same as the spacing between electrodes 208BA and 208BB. Voltage measuring circuit 226A can be interconnected between electrodes 208BA and 208BE. Substantially symmetrically, below electrode 208BC, can be positioned electrode 208BD, and voltage measuring circuit 228A can be electrically interconnected therebetween.

Interconnected between each of the voltage measuring circuits can be a second difference measuring circuit substantially the same as that described in the fast embodiment. In the present embodiment, second difference circuit 230B can be connected between voltage measuring emits 226 and 226A; second difference circuit 230C can be connected between voltage measuring circuits 228 and 228A; and second difference circuit 230A can be connected between voltage measuring circuits 226 and 28.

Each of the voltage measuring circuits and second difference circuits can send corresponding signals to the telemetry/controller 216 for signal transmission to the earth's surface. In FIG. 9A, electrical current is injected at injection electrode 208AA, similar to the first embodiment of the invention, and returned at a surface return electrode 234, as in the first embodiment. In FIG. 9A, measurements of voltage drop and second difference are shown being made between electrodes 208BE, 208BA and 208BB. The earth formation for which the electrical resistivity is determined corresponds to the axial positions of the electrodes. In FIG. 9B, measurements are shown being made between electrodes 208BA, 208BB and 208BC. The earth formation for which the resistivity is being determined is axially spaced apart from that as in FIG. 9A by a distance corresponding to the spacing between the measuring electrodes. In FIG. 9C, measurements are shown being made between electrodes 208BB, 208BC and 208BD. Again the earth formation for which resistivity is being determined is axially spaced from that in FIG. 9B by an amount corresponding to the axial spacing between the electrodes.

As can be determined by referring to FIGS. 9A, 9B and 9C, three different portions of the earth formation can be measured without moving the instrument 10 by using an electrode configuration as shown in FIGS. 9A, 9B and 9C. It is to be understood that the numbers of measuring electrodes shown in FIGS. 9A, 9B and 9C are meant to serve only as an illustration of the principle of obtaining a plurality of formation resistivity measurements with the instrument in a single position within the casing 202. The electrode configuration shown in FIGS. 9A, 9B and 9C is not to be construed as a limitation on the invention.

Figure 10B:
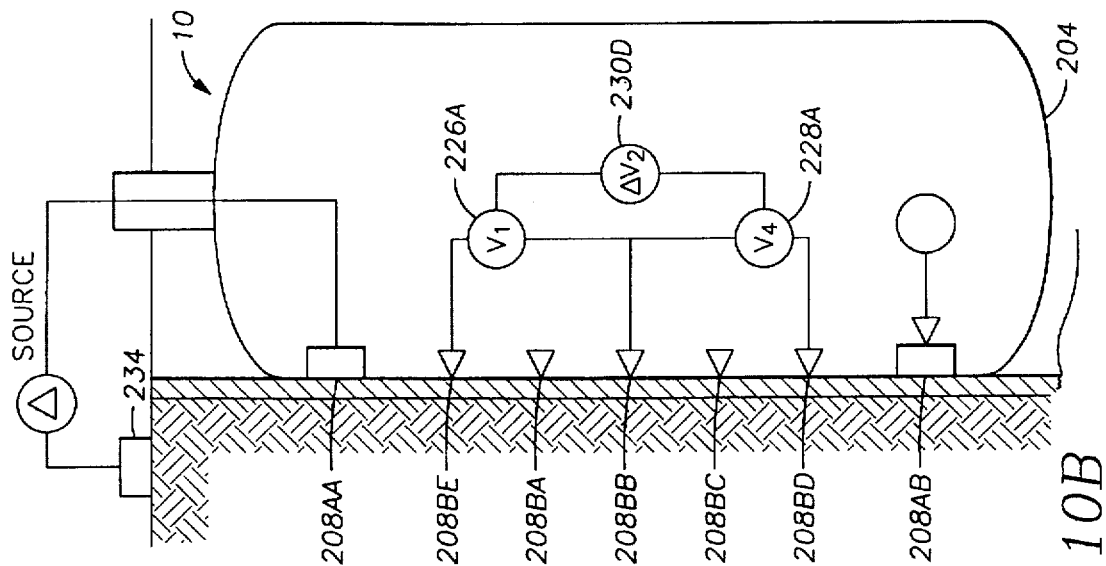
FIGS. 10A and 10B show alternative arrangements of electrodes capable of making resistivity measurements having different radial depths of investigation into the earth formation.
Figure 10A:
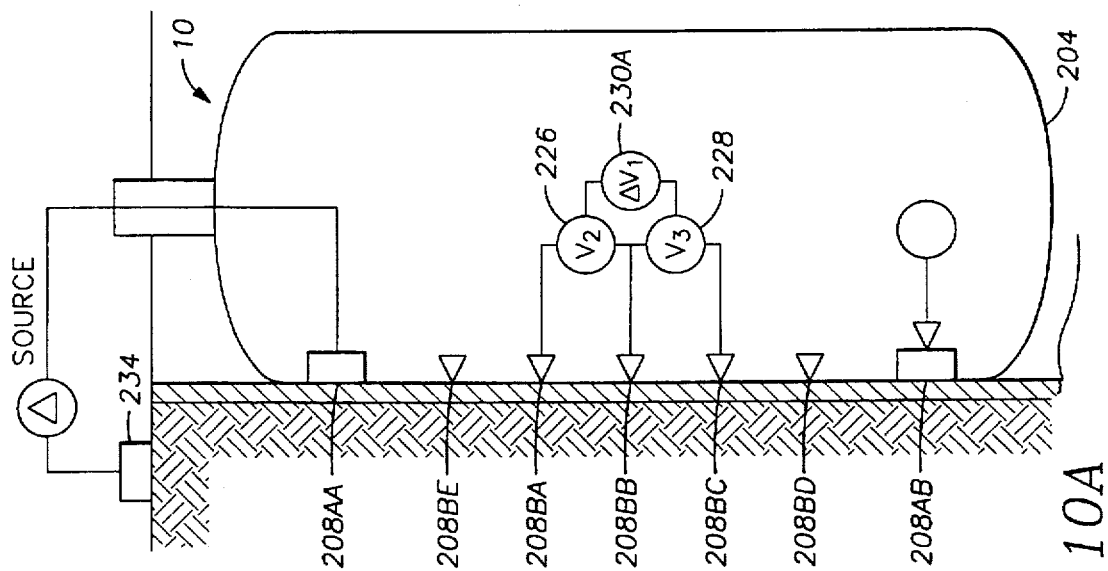

Yet another alternative embodiment of the invention can be observed by referring to FIGS. 10A and 10B. In FIG. 10A, the mandrel 204 can include five measuring electrodes axially positioned substantially as described in the second embodiment of the invention. Voltage measuring circuits 226 and 228, and second difference measuring circuit 230A are shown interconnected substantially as in FIG. 9B of the second embodiment. The electrical configuration shown in FIG. 10A is substantially the same as, and makes substantially the same measurements corresponding to resistivity of the earth formation as the configuration shown in FIG. 9B of the second embodiment, and as in FIG. 6A for the first embodiment. By referring now to FIG. 10B, a measurement of the earth formation having a larger radial depth of investigation can be made without moving the instrument 10. Voltage measuring circuit 226B is shown interconnected between measuring electrodes 208BE and 208BB, which can be spaced from each other at twice the distance as between electrodes 208BA and 208BB. Symmetrically on the other side of electrode 208BB, voltage measuring circuit 228B is interconnected between electrodes 208BB and 208BD. Second difference circuit 230D can be interconnected between voltage measuring circuits 226B and 228B. By measuring voltage drop and second difference at greater axial spacings along the casing 202, it is possible to determine the resistivity of the earth formation at a greater radial depth away from the casing 202, without moving the instrument 10. As is understood by those skilled in the art, the resistivity measurement at greater radial depth from the casing 202 is less likely to be affected by cement (not shown in FIG. 10B) which is typically inserted between the casing 202 and the earth formation to complete the wellbore. The resistivity measurement having greater radial depth can be compared to the measurement made as shown in FIG. 10A to estimate the effects of cement and fluid invasion on the measurements of resistivity.

Those skilled in the an will be able to devise variations of the present invention which do not depart from the spirit of the invention disclosed herein. The present invention, therefore, should only be limited in scope by the claims appended hereto.

What is claimed is:

1. An apparatus for measuring resistivity of earth formations penetrated by a wellbore, said wellbore having a conductive conduit inserted therein, said apparatus comprising:

an elongated sonde mandrel adapted to traverse the interior of said conduit;

electrodes positioned at axially spaced apart locations along said sonde mandrel, said electrodes electrically insulated from said sonde mandrel and from each other, said electrodes adapted to electrically contact said conduit, said electrodes positioned substantially collinearly so that said electrodes contact said conduit when said sonde mandrel is radially displaced towards a wall of said conduit, said electrodes including injection electrodes for injecting electrical current into said conduit, said electrodes including measuring electrodes for measuring voltage drop along said conduit at axially spaced apart locations;

a source of electrical current connected to said injection electrodes;

a current measuring circuit for measuring current output of said source of electrical current;

voltage measuring circuits connected to said measuring electrodes;

second difference measuring circuits interconnected between said voltage measuring circuits;

means for recording measurements made by said voltage measuring circuits, said second difference measuring circuits and said current measuring circuit;

a controllable hydraulic fluid pressure source disposed within said apparatus; and locking arms each of which includes opposing hydraulic cylinder and piston combinations, said combinations pivotally attached to said sonde mandrel, pairs of said combinations centrally linked by a pivot so that extension of said combinations by selective connection to said hydraulic fluid pressure source causes said pivots to be radially displaced away from said sonde mandrel, thereby urging said sonde mandrel into contact with said conduit, wherein at least one of said locking arms further comprises pairs of opposing hydraulic cylinder and piston combinations and pivots, said pairs angularly pivotally attached to said mandrel so that extension of said pairs causes said pivots and linking said pairs to radially displace from each other when displaced from said sonde mandrel, thereby urging said sonde mandrel into contact with said conduit in a particular rotary orientation.

2. The apparatus as defined in claim 1 wherein said locking arms each include an hydraulic flow controller disposed in an hydraulic line connected to each said locking arm for causing each of said locking arms to extend and to retract at a substantially equal rate.

3. The apparatus as defined in claim 1 further comprising selectively extensible kick-off assemblies, each of said kick-off assemblies disposed within said sonde mandrel at an axial location for each one of said pivots, each of said kick-off assemblies providing the collocated one of said pivot and said cylinder and piston combinations an initial displacement from said sonde mandrel when said piston and cylinder combinations are substantially retracted.

4. The apparatus as defined in claim 3 wherein each of said kick-off assemblies further comprises a plurality of concentric interlocking hydraulic pistons, said pistons having inner faces selectively connectible to said hydraulic fluid pressure source to extend said kick-off assemblies outwardly from said sonde mandrel, said pistons having outer faces selectively connectible to said hydraulic fluid pressure source to retract said kick-off assemblies inwardly to said sonde mandrel, said kick-off assemblies for providing sufficient force to urge said sonde mandrel into contact with said wall of said conduit when said locking arms are insufficiently radially displaced from said sonde mandrel.

5. The apparatus as defined in claim 1 further comprising:

a controllable hydraulic fluid pressure source; and wherein each of said electrodes includes an hydraulic piston, said piston selectively connectible to said hydraulic fluid pressure source to urge said electrode into contact with said conduit, said piston selectively connectible to said hydraulic pressure source to retract said electrode from contact with said conduit.

6. The apparatus defined in claim 5 further comprising threads on an exterior surface of said piston and mating threads on a cylinder in which said piston is disposed, said threads and said mating threads causing said piston to rotate when said piston is extended, thereby improving penetration of scale or corrosion on said conduit by said electrode.

7. The apparatus as defined in claim 5 further comprising impedance measuring circuits, each of said impedance measuring circuits electrically connected between a pair of said electrodes, said impedance measuring circuits for determining electrical contact impedance of said electrodes with said conduit.

8. The apparatus as defined in claim 7 further comprising means for controlling output of said hydraulic fluid pressure source connected to said impedance measuring circuits for adjusting said output when said contact impedance exceeds a predetermined value.

9. The apparatus as defined in claim 1 further comprising a flux cancellation circuit including a magnetic flux sensor disposed near inputs of said voltage measuring circuits and a current loop substantially coplanar with said electrodes, said flux cancellation circuit substantially reducing magnetic flux caused by eddy currents flowing in and current injected into said conduit.

10. An apparatus for measuring resistivity of earth formations penetrated by a wellbore having a conductive conduit inserted therein, said apparatus comprising:

an elongated sonde mandrel adapted to traverse said conduit;

a controllable hydraulic fluid pressure source disposed within said apparatus;

electrodes positioned at axially spaced apart locations along said sonde mandrel, said electrodes electrically insulated from said sonde mandrel and from each other, said electrodes adapted to electrically contact said conduit, said electrodes positioned substantially collinearly so that said electrodes contact said conduit when said sonde mandrel is radially displaced towards a wall of said conduit, said electrodes including injection electrodes for injecting electrical current into said conduit, said electrodes including measuring electrodes for measuring voltage drop along said conduit at axially spaced apart locations;

selectively extensible locking arms for urging said sonde mandrel into contact with said conduit, said arms radially positioned opposite to said electrodes, said locking arms comprising opposing hydraulic cylinder and piston combinations pivotally attached to said sonde mandrel, said cylinder and piston combinations each centrally linked by a pivot so that extension of said cylinder and piston combinations by selective connection to said hydraulic fluid pressure source causes said pivot to be radially displaced away from said sonde mandrel, at least one of said locking arms comprising a pair of said pivots, said at lease one locking arm angularly pivotally attached to said mandrel so that extension of said at least one arm causes said pair of pivots thereon to radially displace from each other, thereby urging said sonde mandrel into contact with said conduit in a particular rotary orientation;

a source of electrical current selectively connected to said injection electrodes;

a current measuring circuit for measuring output of said source of electrical current;

voltage measuring circuits connected to said measuring electrodes;

second difference measuring circuits interconnected between said voltage measuring circuits; and means for recording measurements made by said voltage measuring circuits, said second difference circuits and said current measuring circuit.

11. The apparatus as defined in claim 10 further comprising selectively extensible kick-off assemblies, each of said kick-off assemblies disposed within said sonde mandrel at the axial location of each of said pivots, so that said pivot and said cylinder and piston combinations can be initially displaced from said sonde mandrel when said piston and cylinder combinations are substantially retracted, said kick-off assemblies comprising a plurality of concentric interlocking hydraulic pistons, said pistons selectively connectible to said hydraulic fluid pressure source to extend said kick-off assemblies outwardly from said sonde mandrel, said pistons selectively connectible to said hydraulic fluid pressure source to retract said kick-off assemblies inwardly to said some mandrel, said kick-off assemblies adapted to provide sufficient force to urge said sonde mandrel into contact with said wall of said conduit when said locking arms are insufficiently radially displaced from said sonde mandrel.

12. The apparatus as defined in claim 10 further comprising a flux cancellation circuit including a magnetic flux sensor disposed near inputs of said voltage measuring circuits and a current loop substantially coplanar with said electrodes, said flux cancellation circuit substantially reducing magnetic flux caused by eddy currents flowing in and current injected into said conduit.

13. An apparatus for measuring resistivity of earth formations penetrated by a wellbore having a conductive conduit inserted therein, said apparatus comprising:

an elongated sonde mandrel adapted to traverse said conduit;

a controllable source of hydraulic fluid pressure disposed within said apparatus;

electrodes positioned at axially spaced apart locations along said sonde mandrel, said electrodes electrically insulated from said sonde mandrel and from each other, said electrodes adapted to electrically contact said conduit, said electrodes positioned substantially collinearly so that said electrodes contact said conduit when said sonde mandrel is radially displaced towards a wall of said conduit, said electrodes including injection electrodes for injecting electrical current into said conduit, said electrodes including measuring electrodes for measuring voltage drop along said conduit at axially spaced apart locations;

selectively extensible locking arms for urging said sonde mandrel into contact with said conduit, said arms radially positioned opposite to said electrodes;

a source of electrical current connected to said injection electrodes;

a current measuring circuit for measuring output of said source of electrical current;

impedance measuring circuits connected between pairs of said electrodes, said impedance measuring circuits for determining electrical contact impedance of said electrodes with said conduit;

an hydraulic pressure controller connected to said impedance measuring circuits for adjusting an output of said hydraulic fluid pressure source if said contact impedance exceeds a predetermined value;

voltage measuring circuits connected to measuring electrodes; second difference measuring circuits interconnected between said voltage measuring circuits; and means for recording measurements made by said voltage measuring circuits, said second difference measuring circuits and said current measuring circuit.

14. The apparatus as defined in claim 13 wherein each of said electrodes comprises an hydraulic piston, said piston selectively connectible to said hydraulic fluid pressure source to urge said electrode into contact with said wall of said conduit, said piston selectively connectible to said hydraulic fluid pressure source to retract said electrode.

15. The apparatus as defined in claim 13 further comprising a flux cancellation circuit including a magnetic flux sensor disposed near inputs of said voltage measuring circuits and a current loop substantially coplanar with said electrodes, said flux cancellation circuit substantially reducing magnetic flux caused by eddy currents flowing in said conduit.

16. The apparatus as defined in claim 13 wherein said measuring electrodes and said voltage measuring circuits and said second difference measuring circuits are adapted to measure voltage drop along said conduit at a plurality of axially spaced apart locations, thereby determining resistivity of said earth formation at a plurality of axial locations without moving said apparatus.

17. The apparatus as defined in claim 13 further comprising additional voltage measuring circuits selectively connected between non-contiguous ones of said measuring electrodes, said additional voltage measuring circuits providing measurement of voltage drop along said conduit over a longer distance than said voltage measuring circuits connected to contiguous ones of said measuring electrodes, said additional voltage measuring circuits providing measurements corresponding to resistivity of said earth formation at a greater radial depth from said conduit than said voltage measuring circuits connected between said contiguous ones of said measurement electrodes.

* * * * *